O. MALCHER.
COMPUTING AND PRINTING SCALE.
APPLICATION FILED MAR. 22, 1916.

1,335,069.
Patented Mar. 30, 1920.
12 SHEETS—SHEET 1.

Inventor:
Otto Malcher
By Brown, Nissen & Sprinkle
Att'ys

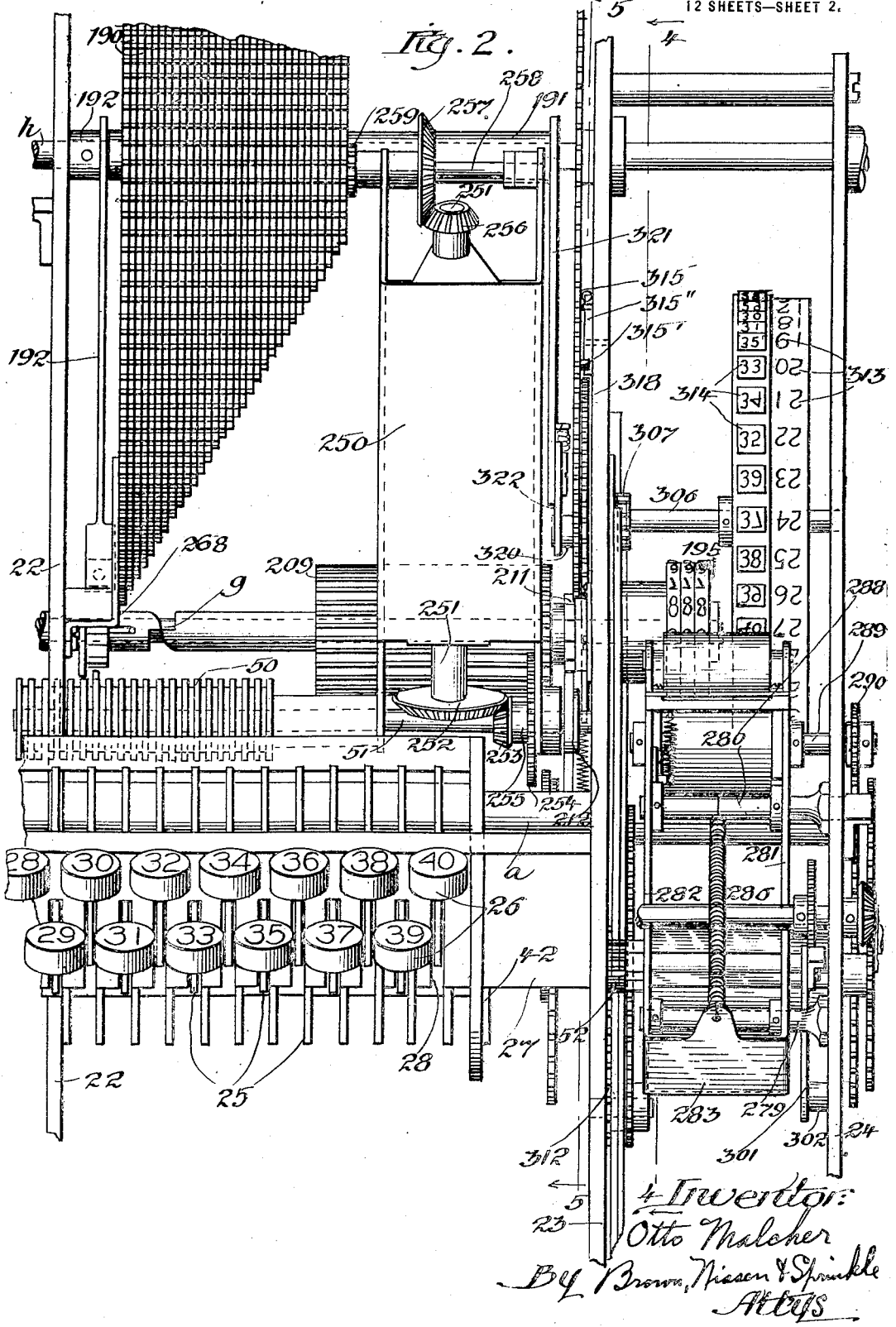

O. MALCHER.
COMPUTING AND PRINTING SCALE.
APPLICATION FILED MAR. 22, 1916.
1,335,069. Patented Mar. 30, 1920.
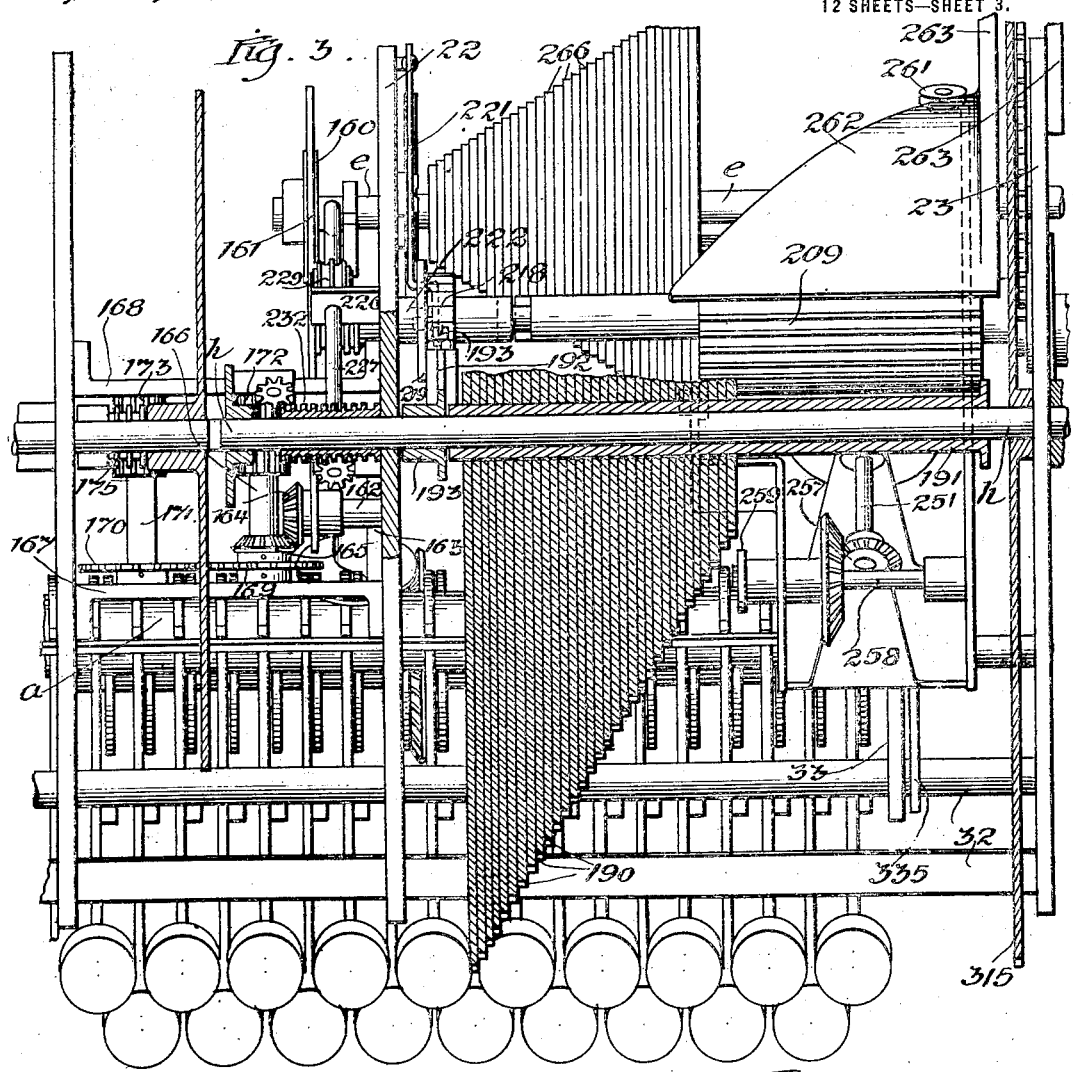
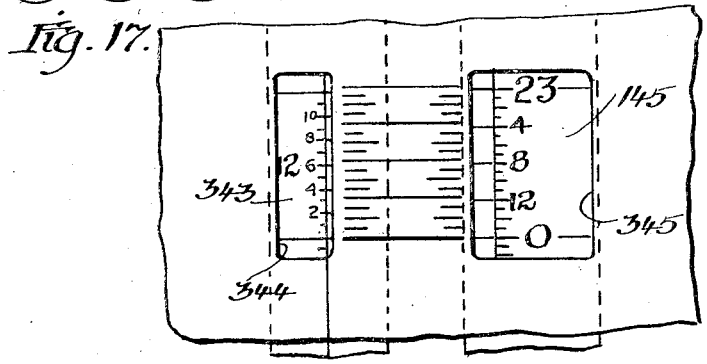
Inventor:
Otto Malcher
By Brown, Niesen & Sprinkle
Att'ys

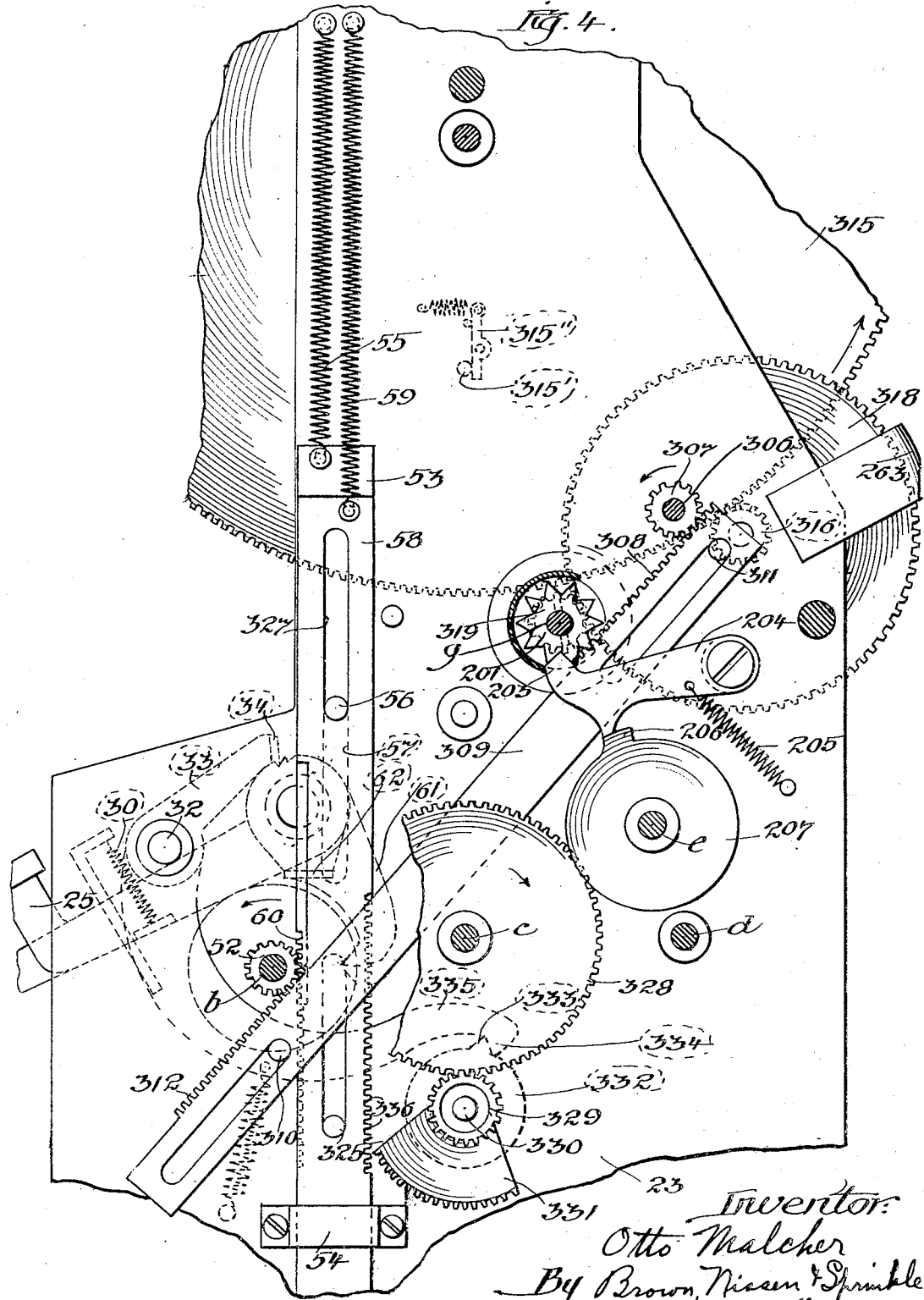

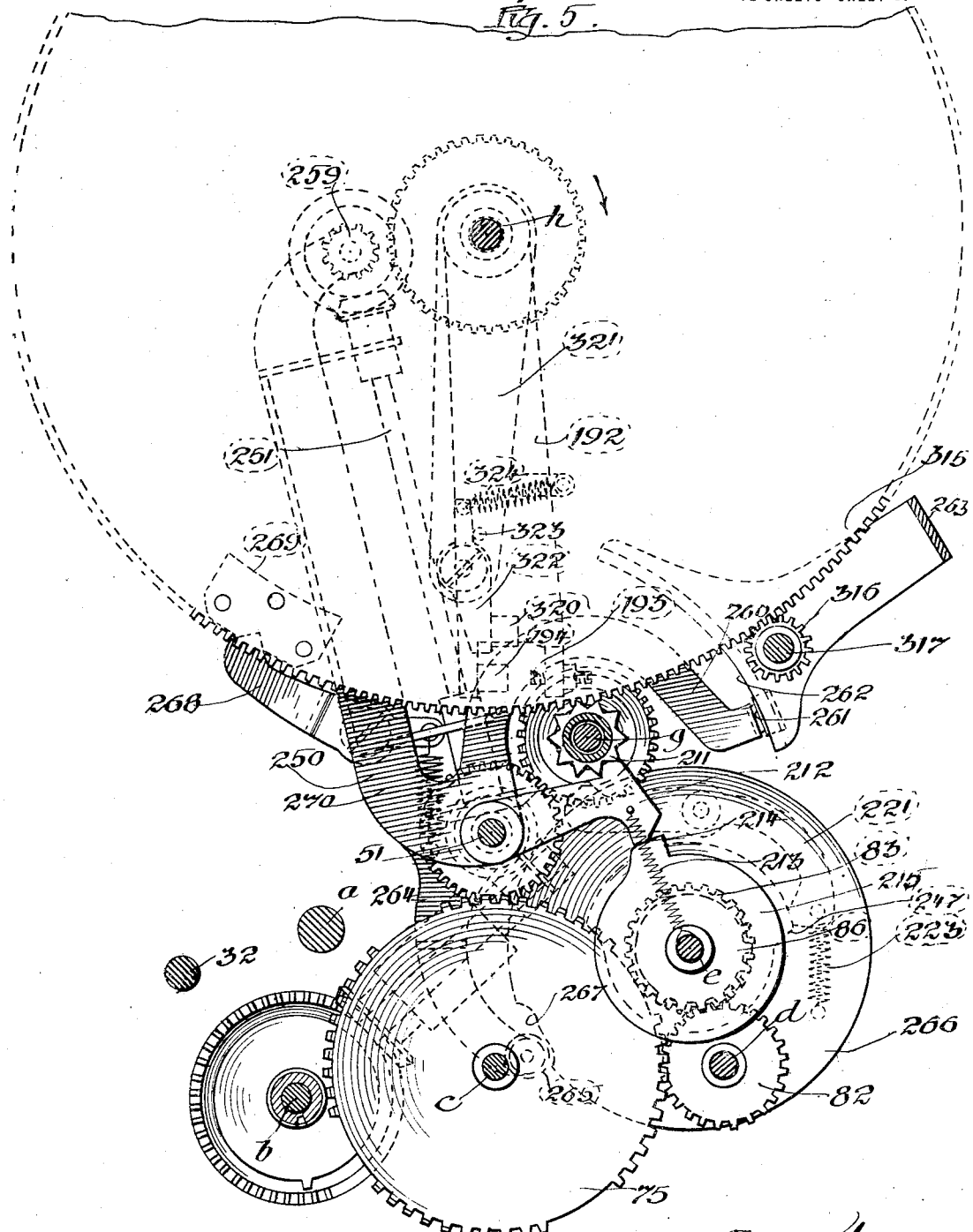

O. MALCHER.
COMPUTING AND PRINTING SCALE.
APPLICATION FILED MAR. 22, 1916.

1,335,069.

Patented Mar. 30, 1920.
12 SHEETS—SHEET 6.

O. MALCHER.
COMPUTING AND PRINTING SCALE.
APPLICATION FILED MAR. 22, 1916.
1,335,069.
Patented Mar. 30, 1920.
12 SHEETS—SHEET 7.
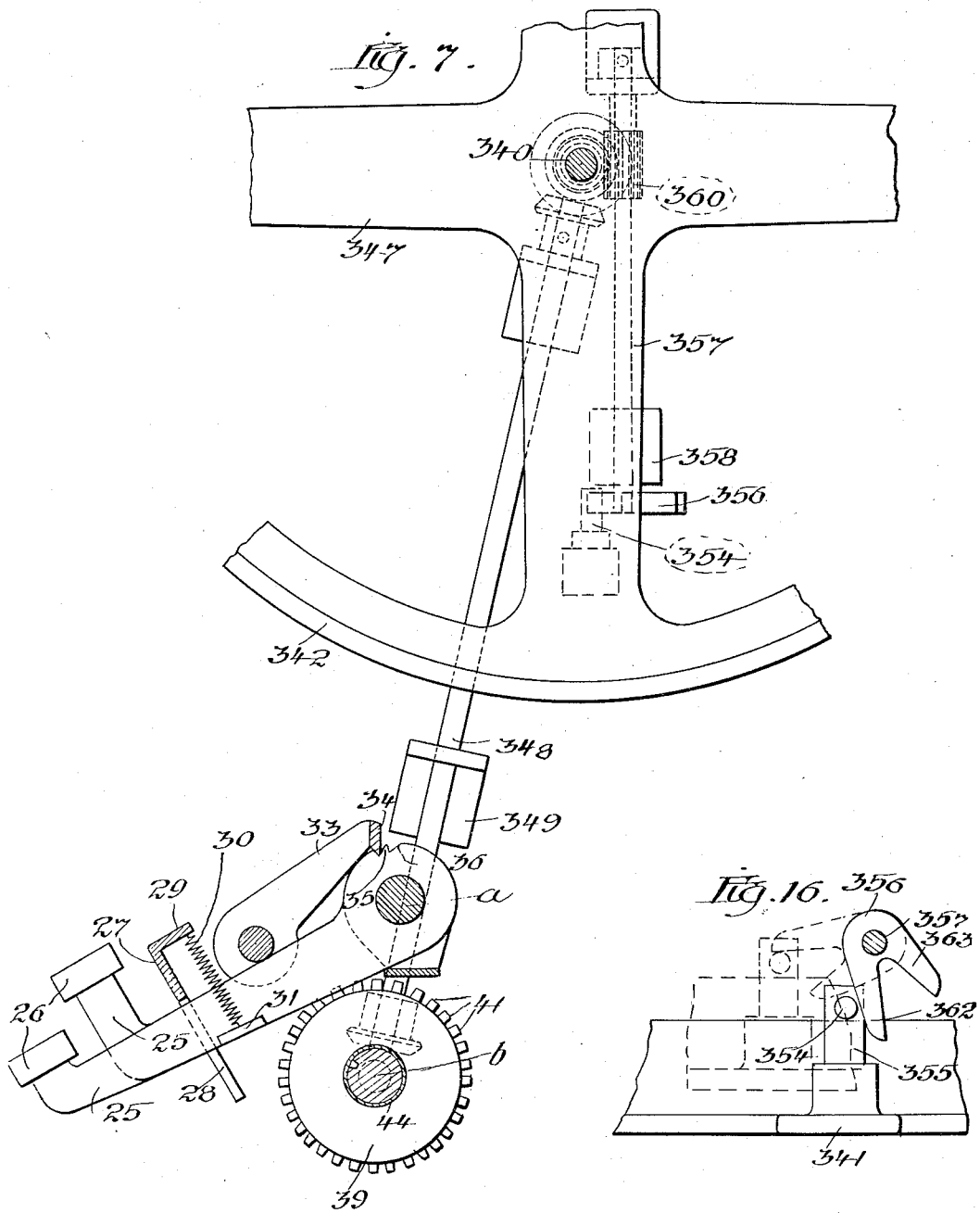

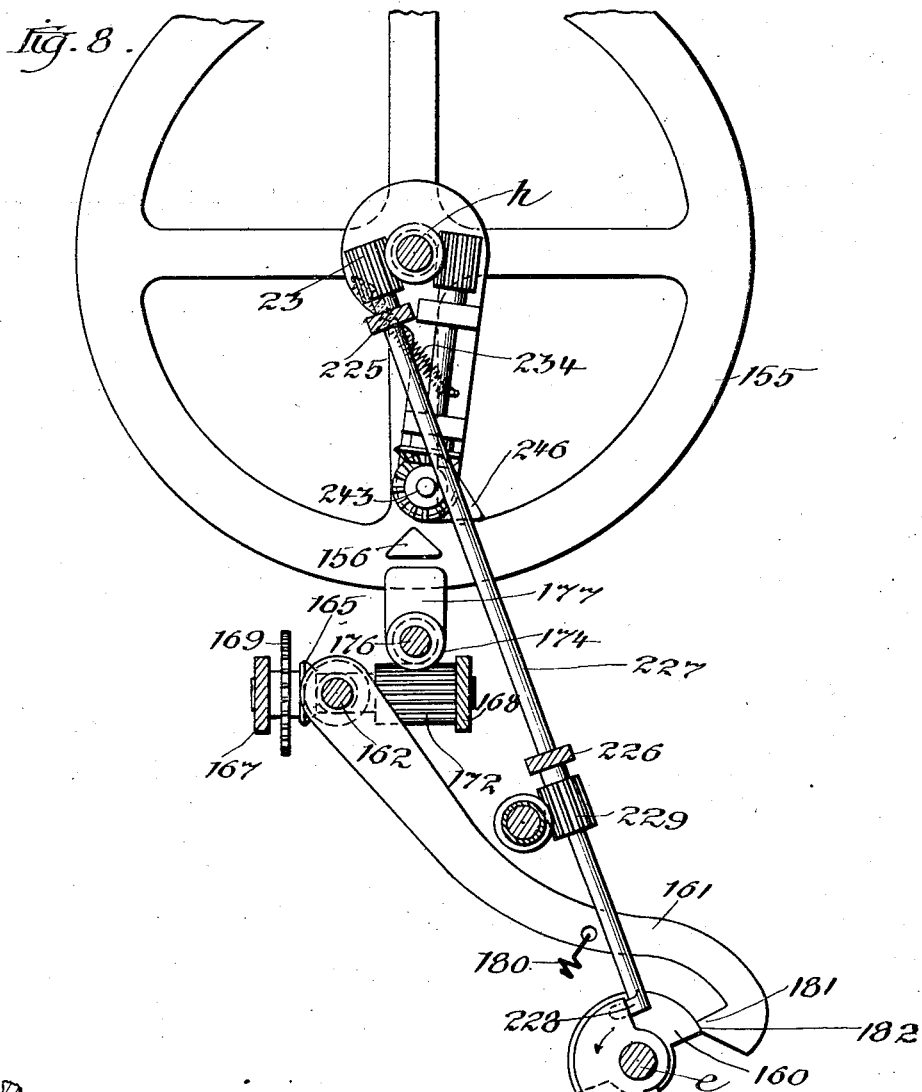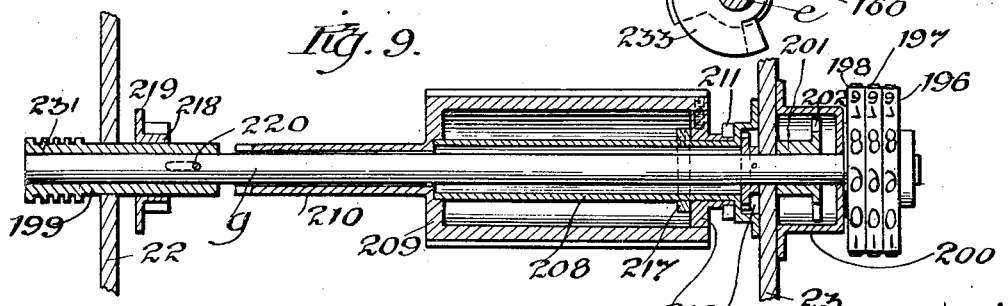

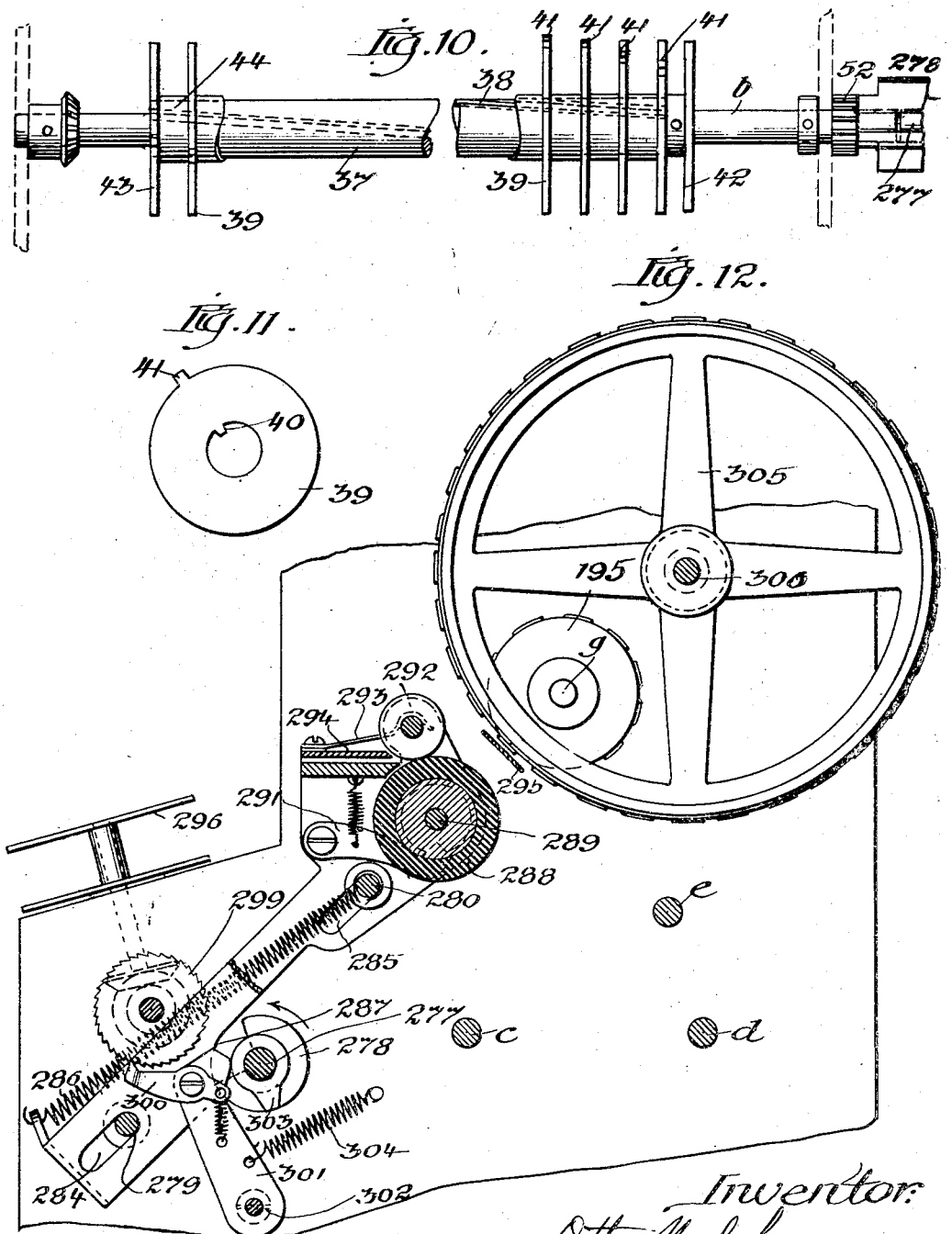

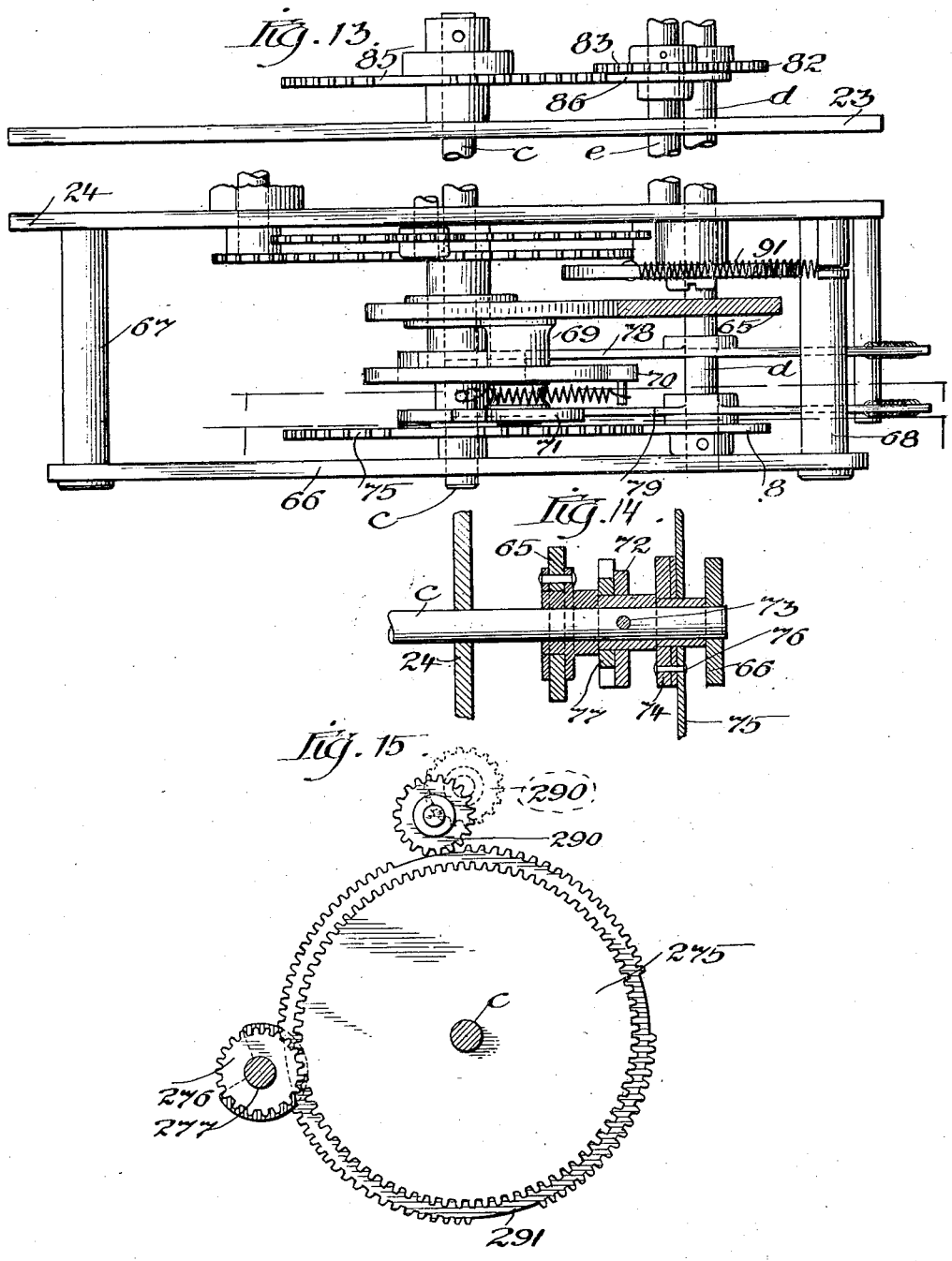

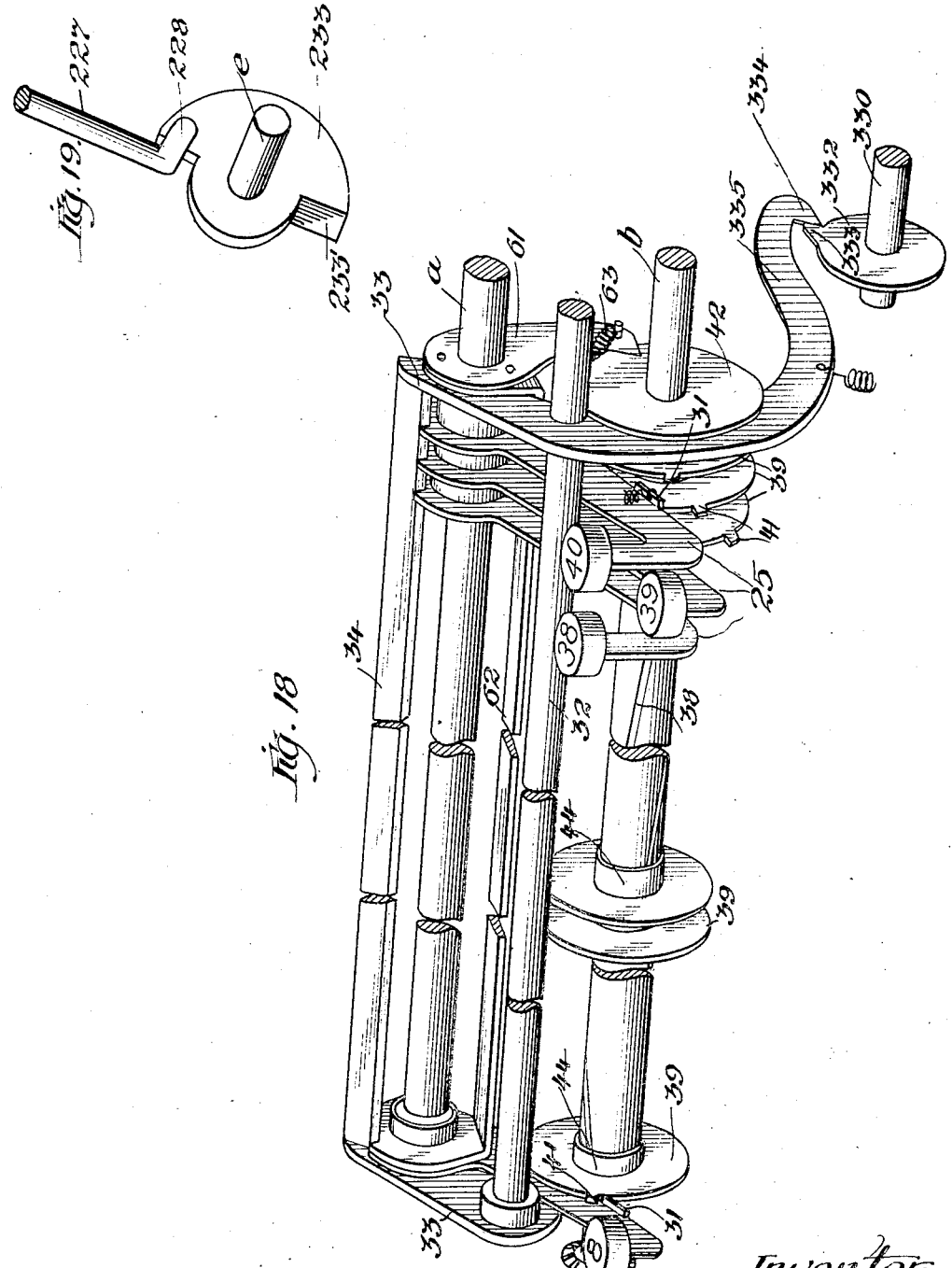

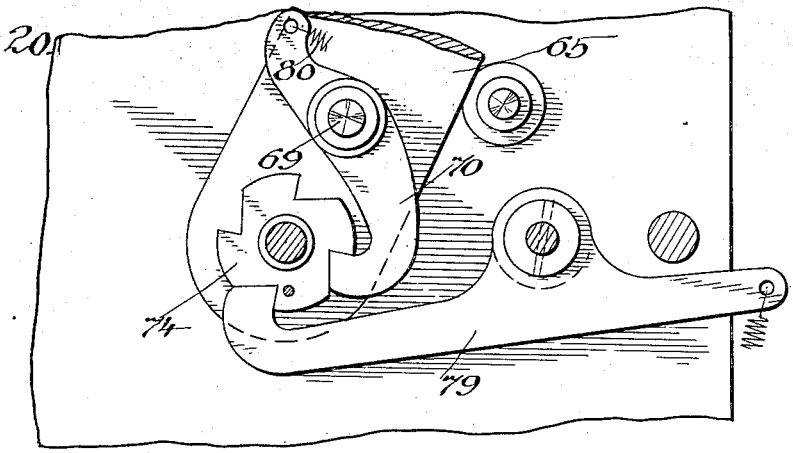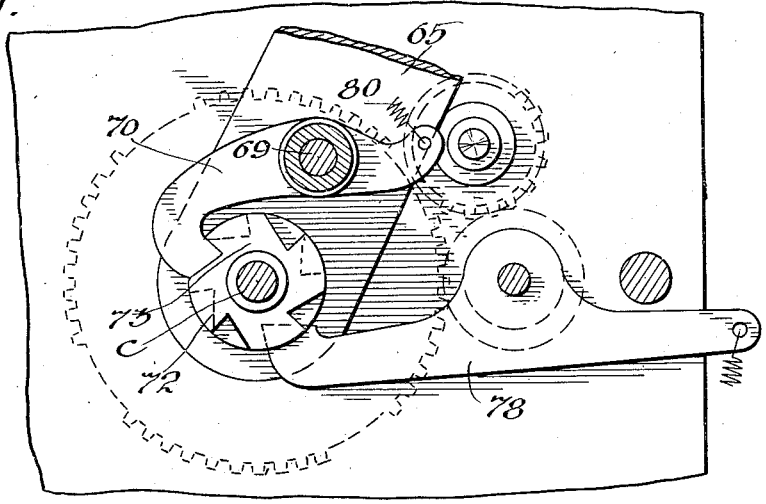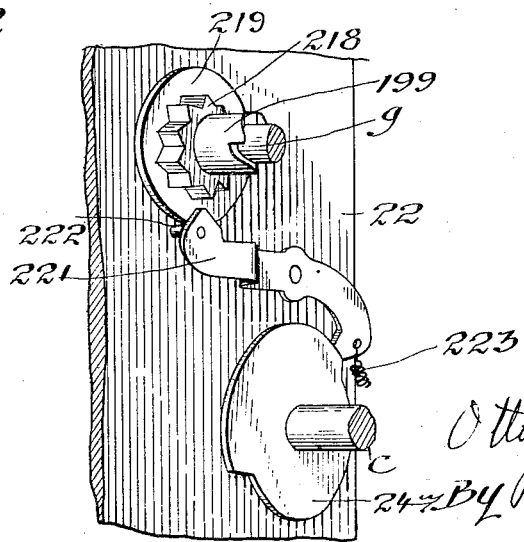

UNITED STATES PATENT OFFICE.

OTTO MALCHER, OF CHICAGO, ILLINOIS, ASSIGNOR TO MALCHER ADDING MACHINE COMPANY, OF CHICAGO, ILLINOIS, A CORPORATION OF ILLINOIS.

COMPUTING AND PRINTING SCALE.

1,335,069.

Specification of Letters Patent. Patented Mar. 30, 1920.

Application filed March 22, 1916. Serial No. 85,950.

*To all whom it may concern:*

Be it known that I, OTTO MALCHER, a citizen of the United States, residing at Chicago, in the county of Cook and State of Illinois, have invented certain new and useful Improvements in Computing and Printing Scales, of which the following is a specification.

This invention relates to a computing and printing device designed especially for use in connection with weighing scales, and has for its object the improvement and simplification of devices of this character, and the provision of a machine that shall be commercially practicable. The invention is exemplified in the combination and arrangement of parts shown in the accompanying drawings and described in the following specification, and it is more particularly pointed out in the appended claims.

Figure 1:
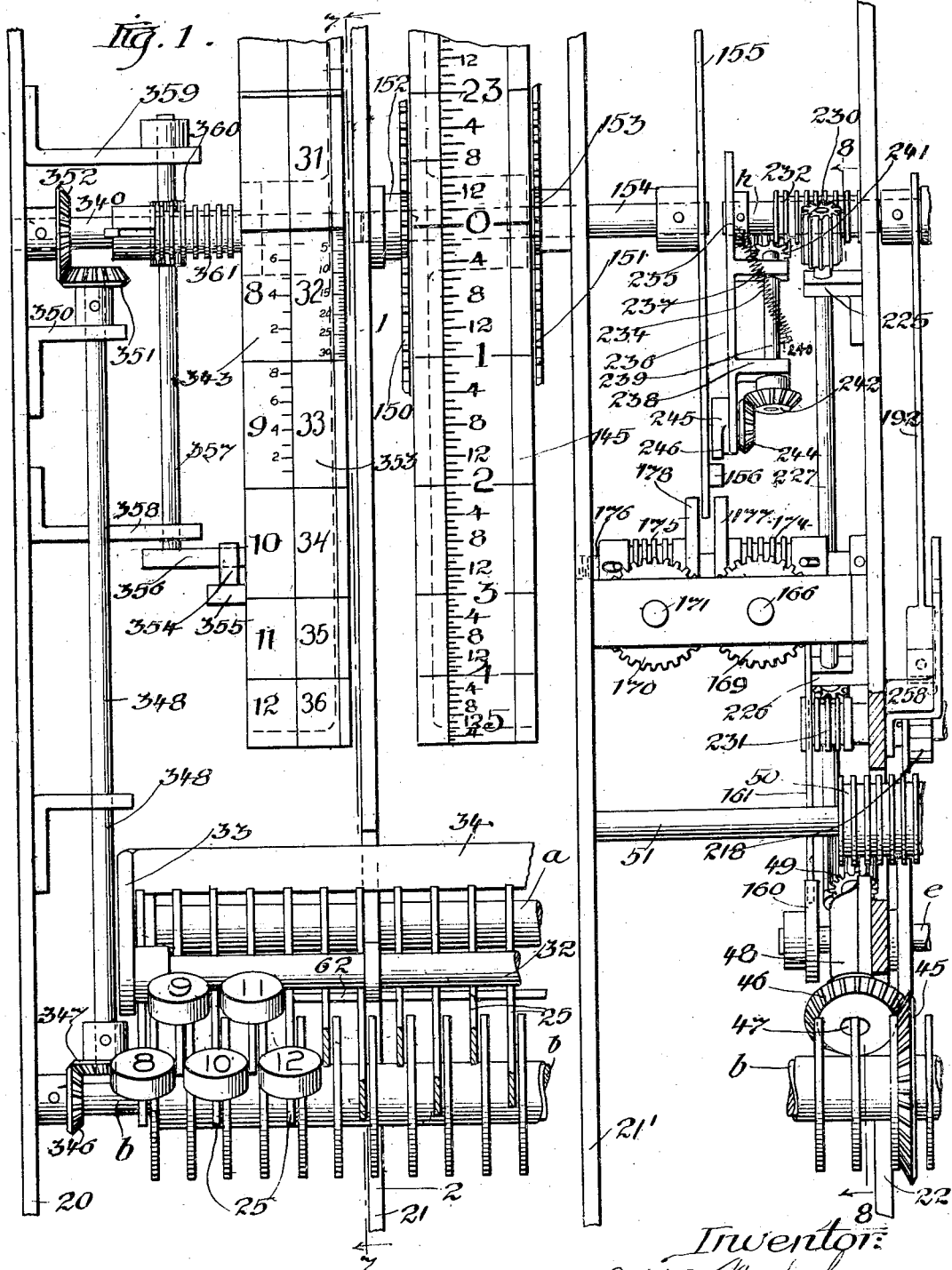
Figure 6:
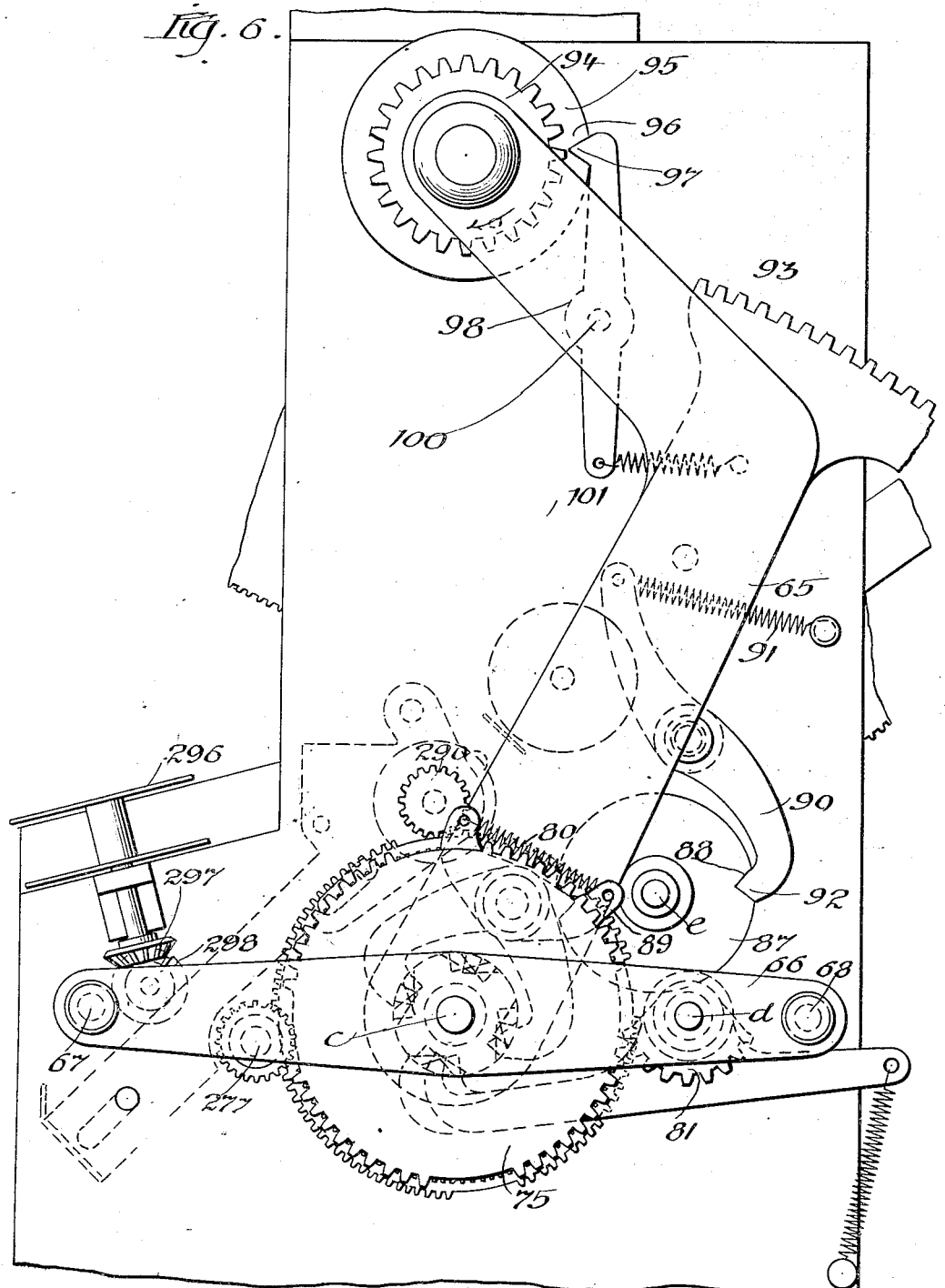

In the drawings, Figure 1 is a fragmentary front elevational view with parts broken away, of one end of a scale mechanism embodying the present invention; Fig. 2 is a view similar to Fig. 1 showing another portion of the same device; Fig. 3 is a horizontal sectional view of a portion of the machine taken through the central axis of the price gears; Fig. 4 is a fragmentary horizontal cross sectional view taken substantially on line 4—4 of Fig. 2; Fig. 5 is a view similar to Fig. 4 taken on line 5—5 of Fig. 2; Fig. 6 is a fragmentary end elevation of a portion of the machine showing the operating handle and associated mechanism; Fig. 7 is a fragmentary sectional view taken on line 7—7 of Fig. 1; Fig. 8 is a detail sectional view taken on line 8—8 of Fig. 1 with parts omitted; Fig. 9 is a vertical sectional view showing the detailed construction of the drive shaft for the counter and the associated parts; Fig. 10 is a detail view showing the stop wheels for the price keys; Fig. 11 is a side elevation of one of the wheels shown in Fig. 10; Fig. 12 is a fragmentary vertical sectional view showing the printing mechanism; Fig. 13 is a fragmentary horizontal sectional view showing the operating handle and driving gears; Fig. 14 is a fragmentary sectional view through the axis of the operating shaft; Fig. 15 is a vertical sectional view showing details of the operating gearing; Fig. 16 is a horizontal sectional view showing a shifting device forming a part of the invention; Fig. 17 is a fragmentary detail showing a scale arrangement used in connection with the device; Fig. 18 is a fragmentary perspective view showing the price keys and coöperating mechanism; Fig. 19 is a detailed perspective view showing a trip device forming part of the invention; Figs. 20 and 21 are detail views with parts omitted showing portions of the handle clutch mechanism; and Fig. 22 is a detail view of a holding dog and associated parts.

To assist in understanding the relations and operation of the various parts of the mechanism, a brief general description of the entire machine will first be given before the various parts are taken up in detail. The invention is designed to be easily adapted to forms of weighing mechanism now common, in which the weighing levers of a scale are made to rotate a shaft or drum an amount proportional to the weight of an article placed upon the scale pan. The particular form of the weighing device itself forms no part of the present invention. The invention, however, is arranged to coöperate with the drum or shaft of scales of the character referred to and to be controlled thereby without in any way interfering with the delicacy of such scales, and without injury to the bearings provided for their movable parts. The only connection to the movable part of the scale proper is through a disk secured to the end of the scale shaft and arranged to be rotated by the weight on the pan an amount proportionate to the weight. The disk has a trip stop secured to its surface but rotates freely without contacting with any of the parts of the computing mechanism. When the computing mechanism is to be operated, the disk is held in place by a clamp which receives the force exerted upon the trip stop by the operation of the computing mechanism and prevents the transmission of any strain to the bearings of the scale itself.

The computing mechanism includes a series of price gears the number of teeth on the different gears being proportional to the price per pound which the particular gear represents. These gears are all coaxial and rigid with one another and are given a complete revolution for each computing operation. A transmission mechanism is provided which may be selectively connected with any one of the various price gears and which transmits motion from these gears to a counter of well known construction carried on and operated by a countershaft. By this connection, the amount of rotation of the countershaft at any operation is made to be proportional to the price represented by the particular gear with which the transmission mechanism is connected. By another system of mechanism, the connection between the price gears and the counter is broken after the price gears have rotated an amount proportional to the weight of an article upon the scale pan. This mechanism is controlled, in a manner which will be described, by the trip stop on the disk carried by the scale shaft. Through this mechanism, the amount of rotation of the counter is made to be proportional to the weight on the scale pan. It is thus apparent that two factors enter into the control of the amount of rotation of the countershaft; namely, the price per pound of the article, and the total weight of the article. It is therefore only necessary to properly proportion the gear mechanism to make the counter read directly in terms of the total value of the article on the scale pan, since the same factors enter into the total value of the article, namely the weight of the article and the price per pound. The figures on the counter are represented by raised characters and mechanism is provided to take an imprint of these figures after a computing operation, in order that a printed ticket may be secured giving the value of the article being weighed. Mechanism is also provided to enable the operator to give a customer an amount of any particular value up to one pound, as, for instance, fifteen cents worth at thirty nine cents per pound. Mechanism is also provided for printing on the customer's ticket, the price at which the article is being sold and also for exhibiting to customers and others in the room, the weight of the article and the price per pound.

*Key-board.*

The mechanism is set to compute the value of an article at any particular price per pound, by means of a key board provided with a series of keys representing the various prices. The drawing illustrates a machine provided with keys representing various prices from eight to forty cents per pound. Construction of the key board mechanism will be best understood by reference to Figs. 1, 2, 3, 4, 7 and 18. The framework of the machine upon which the various mechanism is supported, comprises a series of upright web members designated by the numerals 20, 21, 21', 22, 23 and 24. Supported by these web members and extending longitudinally of the front portion of the machine, is a shaft $a$ on which the key levers 25 are pivotally mounted. The key levers 25 are each provided with finger pieces 26 which bear numerals designating the prices which the particular keys represent. Extending longitudinally of the machine in front of the key shaft $a$ is a web member 27 provided with guide slots 28 through which the key levers pass and also provided at its upper edge with an inwardly bent web 29. Secured to the web 29 are a plurality of coil springs 30 the lower ends of which springs are secured to projections 31 formed on the key levers 25. The springs 30 normally hold the key levers in their uppermost position in contact with a universal shaft 32 on which are pivotally mounted arms 33 carrying a universal lock bar 34. Each key lever is provided with a pair of notches 35 and 36 with which the bar 34 coöperates to hold the keys in their different positions.

Extending longitudinally of the machine, below the shaft $a$ and the key levers 25, is a shaft $b$ mounted to rotate in the supporting webs of the framework. This shaft $b$ is shown in detail in Fig. 10 and has rigidly secured thereto an enlarged portion 37 provided with a spiral groove or keyway 38. A plurality of disks 39 (Fig. 11) are mounted on the portion 37 of the shaft $b$ and each disk has an inwardly projecting lug 40 arranged to coöperate with the keyway 38, and an outwardly projecting tooth 41 arranged on the same radial line with the lug 40. These disks 39 are slid into position on the shaft $b$ and are secured in place by end disks 42 and 43. It will be apparent that when all of the disks are assembled on the shaft, the various teeth 41 will be arranged spirally about the shaft, all of the teeth being disposed at equal angular distances from one another. The disks are spaced from one another by sleeves or collars 44, and are arranged the same distance apart as the key levers 25, there being one disk for each key. The teeth 41 project from the their respective disks in position to be intercepted by the projections 31 on the keys 25 when the keys are depressed as will be apparent from Fig. 18. The shaft $b$, as viewed in Fig. 7, rotates in a counter-clockwise direction during this operation. The arrangement is such that if the lowest priced key is depressed, there will be but a small amount of rotation before the key intercepts its corresponding disk, but if keys representing higher prices are depressed, the amount of rotation of the shaft $b$ will be correspondingly increased before the depressed key intercepts its corresponding disk.

Adjacent the supporting frame web 22, the shaft $b$ has rigidly secured thereto a beveled gear 45 (Fig. 1) which meshes with a beveled pinion 46 carried on a shaft 47 mounted for rotation in a bearing 48 carried on the support 22. The end of the shaft 47 opposite the pinion 46, carries a spur gear 49 meshing with a rotary sliding cylindrical rack 50 mounted for free movement of the shaft 51. It will be apparent that the rotation of the shaft $b$ will slide the rack 50 longitudinally on the shaft 51 through the train of gearing decribed, an amount proportional to the amount of rotation of the shaft $b$ and determined by the particular price gear operated to limit the rotation of this shaft. The amount of longitudinal movement of the rack 50 controls the gear connection between the price gears and the counter, in a manner which will be later described.

The mechanism for rotating the shaft $b$ will best be understood from Fig. 4 of the drawing. Secured to the end of the shaft $b$ adjacent the frame member 23 is a pinion 52 which meshes with a rack bar 53 mounted to slide vertically on the web member 23 and held in place by a guide 54. A spiral spring 55 is connected to the upper end of the rack bar 53 and tends normally to draw the bar upwardly. The amount of upward movement of the bar is limited by a pin 56 secured to the frame 23 and projecting through a slot 57 in the rack bar, indicated by broken lines in Fig. 4. A second rack bar 58, provided with a spring 59, is imposed upon the bar 53 for the purpose of returning the bar 53 to its initial position after each operation, by mechanism to be later described. The rack bar 53 is provided with teeth 60 which mesh with the teeth on the pinion 52 and which rotate the pinion and shaft $b$ in a counter-clockwise direction when the rack is moved upwardly by the spring 55. The rack is normally held against upward movement by a detent 61, shown in Fig. 18 and in broken lines in Fig. 4, which engages a notch in the end disk 42 and holds the shaft $b$ from rotation. A spring 63 draws the detent 61 against the disk 42. The detent 61 is pivotally mounted on the shaft $a$ and is rigid with a universal bar 62 which is also pivotally carried by the shaft $a$ and which extends longitudinally of the key board in a position just beneath the key levers 25. It will be readily understood from Fig. 4 that when any one of the keys 25 is depressed, the bar 62 will be rotated about the shaft $a$ and the detent 61 forced out of engagement with the disk 42, thus releasing the shaft $b$ and leaving it free to rotate under the influence of the rack 53 and spring 55. Before the detent 61 moves out of engagement with its coöperating notch, the projection 31 on the depressed key will have moved into position to intercept the tooth 41 on its corresponding disk, so that when the shaft $b$ is released, it will rotate until stopped by the projection 31 on the particular key depressed, the amount of rotation thus being limited to an amount corresponding to the price represented by the particular key operated.

Handle mechanism.

The handle mechanism by which the operating parts of the machine are driven, is best shown in Figs. 6, 13, 14, 20 and 21. A handle lever 65, as shown in these figures, is mounted externally of the frame member 24 and is rotatably carried on the shaft $c$. The outer end of the shaft $c$ is journaled in a bar 66 carried on pins 67 and 68 projecting laterally from the frame member 24. Projecting from the side of the handle 65 toward the supporting bar 66, is a pivot pin 69 which carries a pair of hooked clutch members 70 and 71. The clutch member 70 nearest the handle bar 65, is arranged to coöperate with a ratchet disk 72 which is rigidly secured to the shaft $c$ by a pin 73, (Figs. 13, 14 and 21). The clutch member 71 coöperates with a ratchet member 74 which is loose on the shaft $c$ but which is secured to a mutilated gear wheel 75 by a pin 76. The ratchet member 72 has rigidly secured thereto and contiguous therewith, a second ratchet member 77 which coöperates with a holding dog 78, Fig. 21, which prevents backward movement of the two ratchet members and the shaft $c$. A similar dog 79 (Fig. 20) coöperates with the ratchet member 74 to prevent backward movement of that ratchet and the gear 75. The upper ends of the clutch members 70 and 71 are connected by a spiral spring 80 which forces the hooked portions of the clutch members into contact with their respective ratchets. When the handle lever 65 is drawn forwardly, or to the left, as shown in Fig. 6, the clutch 71 will contact with the ratchet 74 and rotate the ratchet together with the mutilated gear 75 in a counter-clockwise direction. The amount of rotation is about 90°, or a quarter of a revolution. On the return stroke of the handle lever, the clutch 70 will engage the ratchet 74 and rotate the shaft $c$ a quarter of a revolution, in a clockwise direction, as viewed in Fig. 6. As will be seen from Fig. 6, the mutilated gear 75 is arranged to mesh with the segmental gear 81 secured to the shaft $d$. This shaft $d$ carries at its opposite end, as shown in Figs. 5 and 13, a pinion 82 which meshes with a pinion 83 of equal size carried on the cam shaft $e$. By means of this gearing, the shaft $d$ is rotated through 180° during the forward movement of the handle lever, and this rotation is imparted to the shaft $e$ which is given a corresponding rotation through 180° in a counter-clockwise direction, as viewed in Figs. 5 and 6. The shaft $e$ carries a series of cams for operating various parts of the device, as will be explained later. The shaft $c$ has rigidly secured thereto at its inner end, a mutilated gear 85 similar to the gear 75 and arranged to contact with a gear segment 86 similar to the segment 81 but carried directly on the cam shaft e. During the return stroke of the handle lever 65, the shaft c as previously explained, will be given a quarter turn in a clockwise direction, as viewed in Figs. 5 and 6, and during this quarter turn a section of gear teeth on the gear wheel 85 will contact with the gear segment 86 and impart a half turn to this segment and the cam shaft e in a counter-clockwise direction, as viewed in Figs. 5 and 6, which is the same direction of rotation which is imparted to it through the shaft d on the forward stroke of the handle. It will thus be seen that for each complete handle operation, the shaft e will be given a complete rotation, one half of the rotation being imparted to it at each stroke of the handle. The shaft e carries a disk 87 provided with oppositely disposed notches 88 and 89. A detent 90 is resiliently held in contact with the disk 87 by means of a spring 91, and is provided with a pointed end 92 which is forced into contact with the notches in the disk 87 to hold the shaft e in position after each half turn of that shaft. The beveled shape of the notches in the disk 87 permits the detent 90 to be forced out of contact with these notches when force is exerted upon the shaft e to rotate the same.

As shown in Fig. 6, the handle lever 65 carries with it an arcuate rack 93 which is arranged to be drawn into mesh with a gear wheel 94 secured to the end of the shaft h which carries the price gears, as will be explained. The shaft h has also rigidly secured thereto, a disk 95 provided with a beveled notch 96 in its periphery, which coöperates with the beveled end 97 of a detent 98 pivoted at 100 on the frame member 24, and provided with a spring 101 by which it is resiliently held in contact with the disk 95. During the forward movement of the handle 65, the rack 93 will contact with the gear 94, forcing the detent 97 out of contact with the notch 96 and imparting a complete rotation to the gear 94 and the shaft h on which the gear is mounted. As the handle continues to move in its forward direction, the rack 93 will leave the gear 94, which will be held in the position to which it has been rotated by the detent 97 again entering the notch 96 in the disk 95. During the return stroke of the handle 65, the rack 93 will again come into mesh with the gear 94 and impart a second rotation to the shaft h but in the opposite direction to that in which it was rotated during the forward movement of the handle.

*Scale.*

Either before or after the price key is depressed, and before the handle is operated, the article being sold is placed upon the scale pan. The scale mechanism may be of any well known or usual construction and is not shown in the drawing. It is sufficient to say that the scale levers are so arranged that the rack bars 150 and 151 are moved a distance proportional to the weight of the article on the scale pan. These bars, as shown in Fig. 1, are arranged to rotate pinions 152 and 153 respectively secured to the shaft 154 which is mounted in bearings in the frame members 21 and 21' of the machine. These bearings may be of a suitable construction to insure free and easy rotation of the scale parts as they are not subjected to any strain due to the computing mechanism. The shaft 154 carries a scale drum or disk 145 which is divided into scale divisions representing pounds and ounces. In the scale shown in the drawing, provision is made to weigh articles of a weight up to twenty-four pounds. The shaft 154 is extended to the right, as shown in Fig. 1, and is provided at its end with a disk 155 (see also Fig. 8). The disk 155 has a trip stop 156 extending from one face thereof and arranged to control the computing mechanism in a manner to be described. The trip stop 156 may be counterbalanced by properly proportioning the parts of the disk 155, or in any other suitable manner, so that the stop will not affect the correct weighing of the scale proper. It is easily seen that the parts to be moved by the weight of the article may be made very light so that they will in no way interfere with the accuracy of the weighing operation and these parts are entirely free from contact with any part of the computing mechanism during the weighing. It will usually be desirable to provide the scale drum 155 with a duplicate set of numerals arranged in opposite directions, so that the weight may be read by both the customer and the attendant, in a manner well known in the art.

*Lock for scale disk.*

After the article is placed upon the scale pan and the scale has come to rest, and after the proper price key has been depressed, the attendant pulls the operating handle forwardly and the first effect of this movement is to clamp the disk 155 rigidly in the position to which it has been moved by the weight upon the scale pan. The mechanism for accomplishing this result will best be understood from Figs. 1, 3 and 8. As soon as the handle starts to move forwardly, the cam shaft e will begin to rotate in a counter-clockwise direction as viewed in Fig. 8, this rotation being produced by the mechanism previously described. Rigidly mounted on the shaft e is a cam disk 160. Bearing on the disk 160 is a lever 161 pivotally mounted on a stud shaft 162 carried by the frame member 22, as shown in Fig. 3. Rigid with the lever 161 is a collar 163 and a bevel pinion 164. The pinion 164 meshes with a similar pinion 165 secured to the shaft 166 which is mounted for rotation in the web members 167 and 168. Rigid with the shaft 166, is a spur gear 169 which meshes with a similar gear 170 rigidly secured to the shaft 171 also mounted for rotation in the web members 167 and 168. Secured to the ends of the shafts 166 and 171 respectively, opposite the gears 169 and 170, are pinions 172 and 173. These pinions mesh with sliding racks 174 and 175 respectively which are mounted on a shaft 176 carried in the frame members 21' and 22 and which are held from rotation on the shaft 176 by pin and slot connections, as shown in Fig. 1. The sliding racks 174 and 175 are provided with clamping jaws 177 and 178 respectively, which jaws are located on opposite sides of the disk 155 and are arranged to rigidly clamp the disk, when moved toward one another. A spiral spring 180 is secured to the lever 161 and normally draws the lever downwardly and toward the cam shaft e. The first effect of the rotation of the cam shaft e is to permit the bearing point 181 of the lever 161 to move off the shoulder 182 of the cam 160 under the influence of the spring 180, and thus to cause rotation of the pinion 164, which in turn rotates the shafts 166 and 171 and moves the clamping jaws 177 and 178 toward one another to securely lock the disk 155 in position. It should be noted that although the clamping jaws 177 and 178 firmly hold the disk from rotation, they are caused to contact with the disk in such a way that they do not produce any strain upon the bearings of the shaft 154.

*Price gears.*

In order that the counter may be driven an amount proportional to the various prices at which articles are sold, a series of price gears 190 is provided. These gears, as shown in Figs. 2 and 3, are made of different diameters, the various diameters being proportional to the different prices at which the scale is designed to compute values. In the particular embodiment of the invention shown in the drawings, each gear is provided with one tooth for each three cents' worth of the highest value it is capable of computing. Although this is not an essential arrangement, it is one that produces convenient proportions and illustrates the principle involved. The largest gear shown in the drawing, represents a price of forty cents per pound, and since the scale is designed to weigh articles up to twenty four pounds, this gear will have one third of twenty four times forty, or three hundred twenty teeth. The next adjacent gear will have one third of twenty four times thirty nine, or three hundred twelve teeth. The other gears are proportioned to the various prices which they represent, the smallest one shown in the drawing representing eight cents per pound and having therefore sixty four teeth. The counter or register to be described is arranged to be selectively driven by the price gears, the gear ratio being such that the counter will register three cents for each tooth on the price gear. A complete revolution of a price gear will therefore register three times as many cents as it has teeth, which is the value of twenty four pounds at the price the particular gear represents. Parts of a revolution will of course register correspondingly proportional values.

The gears are all rigidly secured together and to a sleeve 191 mounted for free rotation on the shaft $h$. The gears are rotated by the shaft $h$ through the medium of an arm 192 mounted on the shaft and rigidly held thereto by a collar 192'. As shown in broken lines in Fig. 5, the arm 192 is bifurcated at its end and one of the prongs of the bifurcation is provided with an adjustable set screw 193. A lug 194 projects from the face of the end gear 190 between the bifurcations of the arm 192, and by this means the gears 190 are turned whenever the shaft $h$ is rotated. There is, however, a small amount of lost motion between the shaft $h$ and the gears 190. The amount of this lost motion can be adjusted by means of the screw 193, and the reason for it will appear later.

*Counter.*

The shaft $g$, which is driven from the price gears 190 through a clutch mechanism to be described, is provided at one end, as shown in Figs. 2 and 9, with a well-known form of counter device, indicated generally by the reference numeral 195, for measuring the number of revolutions made by the shaft. The counter 195 is provided with a series of disks 196, 197 and 198, which correspond to units, tens and hundreds orders respectively, of the numbers representing the values computed. Each disk is provided with raised figures representing the digits from zero to nine, and in order that a printed impression may be taken from these digits and appear in the proper position on the printed ticket, the digits are reversed on each disk, and in order that the digits may appear in their proper order, they are also inverted on the disks, so that the ticket when printed will need to be turned around to bring the units order to the right and the thousands order to the left. The units disk 196 is driven directly by the shaft $g$ and a carrying mechanism of well known construction connects the various disks, so that for each revolution of one disk the disk next adjacent on the left thereof will be moved one tenth of a revolution. Counters of this character are well known and are carried in stock by the trade.

The shaft $g$ is journaled at the end adjacent the counter, in the frame member 23, and the opposite end of the shaft is provided with a sliding clutch 199 which is journaled in the frame member 22, as shown in Figs. 9 and 22. Adjacent the counter is a casing 200 which incloses a star wheel 201 secured to the shaft $g$. The casing 200 is provided with a slot 202 through which the beveled end 203 of the dog 204 (Fig. 4) projects. The dog 204 is pivotally carried on the frame member 23 and is provided with a spiral spring 205 which normally tends to draw the point 203 away from the star wheel 201. The dog is held in contact with the star wheel by means of a cam 206 on the disk 207 secured to the cam shaft $e$. When the dog is in contact with the star wheel, it straightens the numerals on the counter 195 and properly alines them in zero position.

Secured to the frame member 23 on the side opposite the counter 195, is a hollow journal 208 which has rotatably mounted thereon a gear drum 209 which is provided with a clutch extension 210 having a clutch member at the end thereof arranged to coöperate with the clutch member 199 slidably mounted on the shaft $g$. The drum 209 is provided at the end adjacent the frame 23, with a star wheel 211. The star wheel 211 is provided with a dog 212 (Fig. 5), having a spring 213 which normally draws the dog away from the star wheel. The dog is forced into contact with the star wheel by a cam 214 carried on a cam gear 215 secured to the cam shaft $e$. The drum 209 is provided with a detachable head 216 which is held in place by a collar 217. This arrangement is provided in order to facilitate assembling of the parts on the journal 208. It will be seen that when the clutch member 199 is connected with the member 210, rotation of the drum 209 will be transmitted to the shaft $g$ and thence to the counter 195. The clutch member 199 carries a star wheel 218 (Figs. 9 and 22) provided with a flange or rim 219 extending entirely around the star wheel on one side thereof. The wheel is rigid with the clutch member 199, which, although free to slide on the shaft $g$ is prevented from turning thereon by a pin 220. The star wheel 218 is provided with a dog 221 (Figs. 3, 5 and 22). The dog 221 has a projection or pin 222 at the end thereof which rests upon the rim 219 of the star wheel 218 and prevents the dog from contacting with the notches of the wheel when the clutch member 199 is in contact with the coöperating clutch member 210. When the clutch member 199 is moved to the left, in Figs. 3 and 9, the lug 222 is free to pass the rim 219 and permit the point of the dog 221 to come into engagement under the influence of a spring 223, with the teeth of the star wheel 218. The purpose of this arrangement will appear later.

*Clutch operating mechanism.*

The mechanism for operating the clutch 199 will best be understood by reference to Figs. 1, 3, 8 and 19. Rotatably mounted in lugs 225 and 226 carried by the frame member 22, is a gear shaft 227 provided at its lower end with an angular projection 228. The shaft also carries pinions 229 and 230. The pinion 229 meshes with the circular rack 231 of the sliding clutch member 199. The pinion 230 meshes with a similar circular rack 232 slidably mounted on the shaft $h$. As shown in Figs. 8 and 19, the angular projection 228 on the shaft 227 normally contacts with the lateral surface of the cam 233 secured to the shaft $e$. The arrangement is such that at the first part of the rotation of the shaft $e$, the member 228 is released, leaving the shaft 227 free to rotate under the influence of a spiral spring 234, through a chain of mechanism which will now be described. The spring 234, as shown in Figs. 1 and 8, has one end secured to a pin 235 carried by an arm 236 secured to the shaft $h$. The arm 236 is provided with a pair of bearing lugs 237 and 238 in which is journaled a shaft 239 carrying a pin 240 having the opposite end of the spring 234 secured thereto. It will be seen that the tension of the spring 234 normally tends to rotate the shaft 239 in the bearing lugs. The shaft 239 has a pinion 241 secured to the upper end thereof and a beveled pinion 242 at its lower end. The pinion 241 meshes with the circular rack 232 mounted on the shaft $h$ and since this rack meshes also with the pinion 230 on the shaft 227, which is held from movement by the cam 233 and angular projection 228, it will be apparent that the shaft 239 is normally held from rotation by the cam 233, but that as soon as the shaft $e$ begins to rotate and the extension 228 is released, the spring 234 will rotate the shaft 239 and hence will shift the clutch member 199 into engagement with the member 210 through the train of gearing described. The arm 236 is provided at its extremity with a stud shaft 243 which is provided at one end with a beveled pinion 244 meshing with the pinion 242 and at the opposite end with a disk 245 provided with a triangular-shaped contact finger 246. The finger 246 is normally held in the retracted position shown in Fig. 8, by the operation of the clutch disk 233 through the mechanism previously described. This permits the scale disk 155 to vibrate freely past zero position during the weighing operation if it is caused to do so.

When the cam disk 233 through rotation of the shaft *e* releases the shaft 227, the contact finger 246 is rotated by the spring 241 into a position to point radially away from the shaft *h*. When so moved, the contact finger is in position to coöperate with the trip stop 156 when the shaft *h* is rotated. It will now be apparent that when the cam shaft *e* begins to rotate immediately after the disk 155 is locked by the clamping jaws 177 and 178, the shaft 227 will be released, which will be rotated by the spring 234 to move the clutch 199 into engagement with the clutch member 210 carried by the gear drum 209, and also to shift the contact finger 246 into position to coöperate with the trip stop 156 as soon as the shaft *h* is rotated by the handle lever in the manner previously described. It will also be apparent that immediately following the movement of the shaft 227, the dogs 204 and 212 will be released by their respective cams 207 and 215 and will be drawn by their springs away from the star wheels 201 and 211, and the shaft *g* and the drum 209 will thus be released and made free to rotate after the drum 209 has been placed into driving relation with the shaft *g* through the medium of the clutch 199. The cam 247 which engages the tail of the dog 221, holds the end of this dog out of contact with the star wheel 218 until after the clutch member 199 has been moved into contact with its coöperating member 210. Immediately after this occurs, the cam 247 will be sufficiently rotated to release the dog 221, which will then be forced toward the star wheel 218 by the spring 223. The dog will be prevented from engaging the star wheel however, because of the fact that the clutch is now in the proper position to cause the flange 219 to be engaged by the projection 222, which will thus hold the dog 221 out of contact with the star wheel. The dog 221 will continue in this relation until the clutch is again moved to the left, as viewed in Figs. 3 and 9, to disengage the clutch from the gear drum 209 for a purpose which will appear later.

*Shiftable gear train.*

In order that rotation of the price gears 190 may be transmitted to the gear drum 209 and thence to the counter 195, a train of gearing carried by a shiftable gear frame is arranged in such a way that the drum 209 may be selectively connected with any one of the price gears 190. This train of gearing is best shown in Figs. 2, 3 and 5. The shiftable gearing referred to is mounted on a frame 250 which is pivotally supported at its lower end on the shaft 51 and which is rigidly secured to the circular sliding rack 50, as previously pointed out. The frame 250 has journaled therein a shaft 251 which is provided at its lower end with a beveled gear 252 meshing with a beveled pinion 253 journaled on the shaft 51. The shaft 253 is rigidly secured to the spur gear 254 by means of a collar 255. The spur gear 254 meshes with the gear drum 209 and remains in driving relation with the drum as the frame 250 is slid longitudinally of the shaft 51. The upper end of the shaft 251 is provided with a pinion 256 which meshes with a gear 257 carried rigidly with a shaft 258 mounted for rotation in the upper end of the frame 250. The shaft 258 extends beyond the frame 250 and is provided at its outer end with a pinion 259 which may be swung into and out of engagement with the price gears 190. As shown in Fig. 5, the frame 250 is provided with a tail piece 260 carrying a cam roller 261 at the end thereof. The roller 260 contacts with a cam guide 262 (Fig. 3). This cam guide is so shaped that it will hold the pinion 259 a fixed distance from the price gears 190 as the frame 250 is moved longitudinally on the shaft 51. The weight of the frame normally tends to move the pinion 259 away from the price gears, and the extent of this movement is limited by the cam roller 261 and the cam guide 262. The cam guide 262 is supported by an arm 263, secured to the frame member 23 and bent to avoid contact with the gear mechanism. As previously explained, the gear frame 250 is adjusted longitudinally on the shaft 51 through the medium of the circular rack 50 and the gears 45, 46 and 49 when one of the price gears is depressed, the amount of movement of the frame being determined by the particular key depressed, and being sufficient to bring the pinion 259 opposite the price gear corresponding to that key.

The frame 250 is provided with a second tail piece 264 (Fig. 5) which carries a cam roller 265 at its lower end in position to coöperate with a series of cam disks 266 (see also Fig. 3). These disks are carried on the cam shaft *e* and are provided with a continuous circular cam surface throughout the greater part of their circumference. Each of the disks, however, has a depressed portion 267 of sufficient length to permit the frame 250 to remain in its retracted position until the clutch 199 has been operated. After this operation has taken place, but before the dogs 204 and 212 have been released, the cam roller 265 rides onto the continuous surface of the disk 266 and the frame 250 is rotated about the shaft 51 to move the pinion 259 into contact with the gear opposite which it has been positioned by the depression of the price key. The pinion will continue to remain in mesh with the price gear, held so by the disk 266 during the remainder of the rotation of the cam shaft. It will be noted that the cam disks 266 are graded in size to correspond to the various angles at which the frame 250 is held by the cam guide 262. It is important that the gear drum 209 and the price gears 190 be held from rotation during the adjustment of the gear frame 250, in order that the initial position of these parts may always be the same at the beginning of a computing operation, and also in order that the pinion 259 may be in position to properly mesh with the teeth of the gears 190 when the frame is swung to bring the pinion into meshing position. For this reason the dogs 204 and 212 are permitted to remain in contact with their respective star wheels until after the pinion 259 is brought into mesh with the gears 190. The gears 190 are meanwhile held in fixed position by a detent 268 pivotally mounted on the frame member 22 (Figs. 2 and 4) and which bears in a notch in a plate 269 secured to the lateral surface of the outer price key 190. The detent 268 is resiliently held in contact with the plate 269 by a spring 270. By this arrangement, the gear drum 209 and the price gears 190 always have a fixed relation to one another at their initial positions, and it is merely a matter of arranging these gears when the machine is assembled in order to assure proper meshing of the gears 190 with the pinion 259 when they are moved into coöperative relation with one another.

After driving connection is established between the price gears and the counter, in the manner described, and after the dogs 204 and 212 have been released to render the gearing freely operable, the rack carried by the lever handle will engage the gear on the shaft h in the manner previously described, and will cause this shaft to make a complete rotation in a clockwise direction, as viewed in Fig. 5. The shaft will rotate a slight amount due to the gap between the bifurcations of the arm 192, before rotation of the price gears will begin. As soon as the set screw 193 engages the lug 194, however, the price gears will be picked up by the arm 192, the detent 268 will be forced from its notch in the plate 269, and the price gears will be carried around with the shaft h. The rotary movement of these gears will be transmitted through the shiftable gear train to the counter 195, where the rotation of the counter disks will be proportional to the number of gear teeth on the particular price gear with which the pinion 259 is in contact. As the shaft h continues to rotate, it will carry with it the arm 236 secured to the end thereof, together with the contact member 246, which as has been previously pointed out, will occupy a radially extending position, so that its path of travel will cause it to strike the trip stop 156 when the arm 236 has rotated through an angle equal to that through which the disk 155 has been rotated by the weight on the scale pan. As soon as the contact finger 246 strikes the trip stop 156, the contact finger will be rotated against the tension of the spring 234 attached to the shaft 239. The rotation of the shaft 239 will slide the circular rack 232 on the shaft h, which sliding movement will in turn rotate the shaft 227, causing the pinion 229 coöperating with the rack 231, to move the clutch 199 longitudinally of the shaft g, thus disengaging the clutch and the shaft g from the gear drum 209. After the gear drum has thus been disconnected, it will continue to be rotated by the price gears during the remainder of the rotation of the shaft h, but since the counter is driven by the shaft g, the driving connection will be broken between the price gears and the counter as soon as the shaft h has rotated an amount proportional to the amount of rotation of the scale disk 155. As soon as the clutch 199 is moved out of engagement with the coöperating member 210, the projection 222 on the dog 221 will move off of the flange 219 and the dog will be snapped into contact with the star wheel 218 by the tension of the spring 223. In this way the rotation of the shaft g and the counter 155 will be immediately stopped, at the same time that the connection is broken with the price gears and the shaft g will be trued up by the beveled end of the dog 221 contacting with the beveled notches of the star wheel 218, so that the counter will be stopped with the numerals in alinement and set at the nearest unit of value corresponding to the amount of rotation of the scale disk. The clutch 199 will be held in its disengaged position by the end of pin 222 bearing against the flange 219.

It will be apparent from an inspection of the drawings, especially Fig. 8, that some time will be required after the contact finger 246 strikes the lug 156 before it will be moved into the position shown in Fig. 8 which position it must reach before the clutch 199 is disconnected from its coöperating member 210. The shaft h is thus permitted to rotate through a small angle in excess of the amount of rotation of the scale disk 155, before the counter has its connection broken with the price gears. If no correction were made for this, the counter would register a greater value than that warranted by the amount of rotation of the scale disk. It is for the purpose of correcting this error that the arm 192 is bifurcated, and the shaft h is permitted to rotate a small amount before rotation of the price gears and consequent rotation of the counter is permitted to begin. By the adjustment of the screw 193, this preliminary rotation of the shaft h may be made to equal exactly the amount of rotation required to operate the clutch 199. In this way the angular movement of the shaft h during which it drives the counter 155, may be made to equal exactly the angular movement of the scale disk.

*Printing mechanism.*

In order that a ticket may be issued to the customer, on which the value set up in the counter 155 is printed, it is necessary to provide mechanism to take an impression off of the figures on the counter after the rotation of the counter by the price gears, and after the clutch has been disconnected from the gear drum 209 and the dog 221 has straightened the disks of the counter. This impression must be taken during the portion of the stroke of the handle lever which occurs after the rack carried by the handle has left the pinion on the shaft $h$, and before the rack reëngages the pinion on its return stroke, since the parts are restored to their normal position by the return stroke, as will be described later. The printing mechanism will be best understood by reference to Figs. 2, 6, 12 and 15. As will be seen by reference to Fig. 15, the shaft $c$ has rigidly secured thereto a gear wheel 275, which meshes with a pinion 276 secured to a shaft 277. The shaft 277 is journaled between the supporting members 23 and 24 of the frame of the machine, and carries a cam roller 278 extending across the opening between the two frame members, as shown in Figs. 2 and 12. Mounted for sliding movement on pins 279 and 280 secured to the frame member 24, is a printing frame consisting of side bars 281 and 282, and a rear connecting bar 283. The bars 281 and 282 are provided with slots 284 and 285 at the upper and lower ends thereof respectively, which slots coöperate with the pins 279 and 280 to guide the printing frame and to limit its longitudinal movement. The frame is normally drawn forwardly by a spiral spring 286 secured to the rear bar 283 of the frame and to the forward supporting pin 280. The side bars, as shown in Fig. 12, are provided with a circular cam portion 287 which coöperates with the cam roller 278. The shape of the cam parts is such that the printing frame is normally held in its retracted position by the roller 278, but the parts are so related that a very slight rotation of the roller in a counter-clockwise direction, as viewed in Fig. 12, will release the printing frame and allow it to move forwardly under the influence of the spring 286. As the cam roller 278 and the shaft 277 are geared to the shaft $c$ through the pinion 276 and gear 275, it is apparent that as soon as the shaft $c$ begins its rotation on the beginning of the return stroke of the operating handle, the cam 278 will be rotated to release the printing frame. The forward end of the printing frame is provided with a platen 288. The platen 288 is carried on a shaft 289 journaled in the upper end of the printing frame and provided at its end with a pinion 290. When the printing frame is in its retracted position, the gear 290 will occupy the position shown in Fig. 6, and in full lines in Fig. 15. When the frame is moved forwardly under the influence of the spring 286, the gear 290 will occupy the position shown in broken lines in Fig. 15. A mutilated gear 291 is secured to the shaft $c$ in position to mesh with the pinion 290 when in retracted position. The platen is provided with a spring pressed pawl 291′ to prevent backward rotation thereof. A roller 292 is mounted on the upper part of the printing frame and is resiliently pressed into contact with the platen 288 by means of springs 293. A strip of paper is fed to the platen 289, and thence through the paper guide 294. After the printing frame has been released by the cam 278, it will be moved forward by the spring 237 to take an impression from the counter wheel, and almost immediately thereafter the cam roller 278 will again engage the cam surface 286 and return the frame to its initial position, where it will be held during the remainder of the rotation of the shaft $c$. As soon as the frame is drawn back to its initial position, the pinion 290 will be moved into position to be engaged by the teeth on the mutilated gear 291, and the platen will be rotated by the mutilated gear and pinion 290 to feed the portion of the paper bearing the imprint forwardly an amount sufficient to constitute the ticket, which is torn off and given to the customer. A ribbon 295 is carried on spools 296, which are driven through beveled gears 297 and 298 from a ratchet wheel 299. The ratchet wheel 299 is operated by a pawl 300 pivotally mounted on the end of an arm 301 pivotally supported at 302 on the frame member 24. At each rotation of the shaft 277, a cam member 303 carried thereby forces the arm 301 backwardly against the tension of the spring 304 and thus causes the pawl 300 to rotate the ratchet 299 to feed the ribbon a small amount in order that a fresh portion of the ribbon may be brought into printing position for each operation. Any well known ribbon reversing mechanism may be used in connection with the ribbon feed.

*Price exhibiting device.*

It is desirable in devices of this character that the price at which the article is being sold shall be exhibited to the customer and to others in order to prevent dishonest operation on the part of the attendant. It is also desirable to print on the customer's ticket not only the total value of the article being sold, but also the price per pound at which the sale is made. The mechanism for accomplishing these results is shown in Figs.

2, 4 and 12. A comparatively large sized wheel 305 is mounted on a shaft 306 journaled between the frame members 23 and 24. The shaft 306 is provided with a pinion 307 which meshes with a rack 308 carried on a bar 309 mounted for sliding movement on pins 310 and 311 secured to the frame member 23. The lower end of the bar 309 is provided with a rack 312 meshing with the pinion 52 carried on the shaft $b$. Since the pinion 52 is governed by the price key depressed, and rotates an amount proportional to the price represented by the depressed key, it is apparent that the shaft 306 and wheel 305 will be rotated a similar amount. The wheel 305 carries a series of numerals 313 which are moved past an opening in the casing of the machine and are so arranged on the wheel that the number corresponding to the key depressed will be stopped opposite the opening when the shaft $b$ is arrested by the depressed key. The wheel 305 also carries a second series of numerals 314 which are arranged to stop in alinement with the numerals on the counter disks, as indicated in Fig. 12, and therefore to make an impression on the customer's ticket, of the price represented by the depressed key, at the same time that the total value of the article being sold is printed. The selling price represented by the numeral 313, will appear to the customer and others in the room immediately upon the depression of the price key, and will remain in view throughout the entire operation, and until the price key is finally released, which occurs at the close of the operation of the machine.

*Counter return.*

When the handle rack engages on its return stroke the pinion carried on the end of the shaft $h$, it will rotate the shaft $h$ in the opposite direction to which it has been previously rotated, and will carry by means of the arm 192, the price gears 190 back to their original position, where they will be held by the detent 268. Before this return movement begins, however, the cam shaft $c$ has begun the second half of its rotary movement and accomplished some movements preliminary to the return of the price gears. The first effect of the rotation of the cam shaft $c$ on the return movement of the handle is the operation of the cam 160 to raise the lever 161 and release the clutch members 175 and 177 and thus free the scale disk 155. About the same time that this occurs, the beveled portion 233' of the cam 233 slides past the projection 228 on the shaft 227, taking the pressure of the spring 234 off the flange 219 and locking the clutch 199 in disengaged position independently of the dog 221. This also locks the contact member 246 in retracted position so that it will not strike the trip stop 156 when the price gears are returned. After these operations, the dog 221 is moved to retracted position by the cam 247. The return movement of the price gears is then begun through the shaft $h$ and the rack 93 as previously described. Although the reverse rotation of the shaft $h$ returns the price gears to their original position, it is apparent that the counter disks 196, 197 and 198 will not be brought back to their starting point, or zero, position by this return movement, and other mechanism must be provided for restoring the counter to zero. This mechanism is shown in Figs. 2, 3, 4, and 5. A large gear wheel 315 is rotatably carried by the shaft $h$ near the frame member 23, and meshes with a pinion 316 carried on the stud shaft 317 which also carries a spur gear 318. The spur gear 318 meshes with a pinion 319 (Figs. 4 and 9) which is rigidly carried on the shaft $g$ adjacent the frame member 23. The large gear 315 is of the same size and is provided with the same number of teeth as the largest one of the price gears 190, and the gear ratio between the pinion 319 carried by the shaft $g$ and the gear 315, is such that when the shaft $g$ is driven from the largest gear 190, the pinion 319 will drive the gear 315 through the gear 318 and pinion 316 at the same rate of speed as that of the gear 190. The gear 315 is provided with a stop 320 connected to one lateral face thereof, as shown in Figs. 2 and 5. The stop 320 is arranged to coöperate with an arm 321 secured to the sleeve 191 which carries the price gears 190. The end of the arm 321 is provided with a pivoted extension 322 which is held from rotation on its pivotal support in one direction by a pin 323, but is free to rotate in the other direction against the tension of a spring 324. When the price gears 190 are rotated by the shaft $h$, the arm 321 will move in a clockwise direction, as viewed in Fig. 5, at the same rate of speed as the price gears, being held in rigid relation therewith by means of the sleeve 191. This rotation of the arm 321 will move the contact member 322 to the left as seen in Fig. 5, ahead of the stop 320. If the counter mechanism is at the same time connected with the largest gear 190, the counter mechanism will be given its maximum speed of rotation and will then drive the gear 315 at its maximum rate of speed, which will be just equal to the rate of speed of the price gears and the arm 321. In this case, the stop 320 will continue in contact with the contact member 322 and will travel in unison therewith. If, however, the counter mechanism is connected with any one of the smaller sized price gears, the gear 315 will be rotated at a less speed than the price gears, and the arm 321 and hence the stop 320 will lag behind the contact member 322, the amount of lag depending upon the particular price gear in driving operation with the counter mechanism. Since the price gears are given a complete rotation at each operation of the scale, the arm 321 will revolve through a complete circle. The stop 320, however, will continue to be driven by the countershaft $g$ only so long as that countershaft is driven by the gear drum 209 through the clutch mechanism 199. When the clutch 199 is disconnected, as previously described, by the trip stop on the scale disk 155, the gear 315 will cease to rotate and the stop 320, carried thereby, will remain in the position it has attained at the time of the disconnection of the clutch, and will continue in this position until the return rotation of the price gears 190, which will carry with them the arm 321. When this return rotation occurs, the contact member 322 will pick up the stop 320 at whatever point it has been left, and will carry it back to its original position. If the value of the article on the scale pan is very small, and the stop 320 is not moved an amount equal to its own thickness and that of the contact member 322, the contact member when rotated will swing around and strike the stop 320 from the opposite direction. If this should occur, however, the spring 324 will yield and no damage will be done. It will be apparent that since there is a fixed gear connection between this stop and the countershaft, the countershaft will be driven backwardly during the return movement of the gear 315, exactly the same amount as it moved forwardly during the computing operation and while it was driving the gear 315 in its forward movement. To prevent the gear 315 from overrunning and driving the counter beyond zero, a limit pin 315' is secured to gear 315 in position to contact with a stop 315'' carried on the frame member 23. The stop 315'' will yield in one direction like stop 322 to allow for the thickness of the stop members when they are brought into contact in a reverse direction, but is held from yielding in the opposite direction to bring the wheel 315 and counter disks to a positive stop at zero position. By this means, no matter how much the counter has been rotated, it will be returned an exactly equal amount, and hence be restored to zero. This will not only restore the counter but will bring the parts of the clutch 199 and 210 into position to move into contact with one another at the next operation, since the drum gear is returned to its original position as previously described, by the price gears themselves. After the countershaft and the gear drum have thus been restored to their initial position, they are locked in this position through the medium of their respective star wheels, and the dogs 204 and 212 which are again forced into contact with the star wheels by means of the cams 207 and 215, which bring the extended portion of their cam surfaces into contact with the dogs during the last part of the second half of the rotation of the cam shaft $e$. In this way, the parts are locked in position preparatory to a second operation.

*Key return.*

Mechanism is provided for restoring the depressed price key and the shaft $b$ to their initial positions, as best shown in Figs. 2, 4, 7 and 18, especially Figs. 4, 5 and 18. The rack 53 is provided with a pin 325 extending from the lateral face thereof and projecting through a slot 326 in the rack bar 58. The rack bar 58 is also provided with a second slot 327 through which the pin 56 secured to the frame member 23 projects. The bar 58 does not interfere with the upward movement of the bar 53 since the slot 57 in the bar 53 is free to slide over the pin 56, and the pin 325 secured to the bar 53 is free to slide upwardly in the slot 326 in the bar 58. The bar 58 is normally held in its upper position with the end of the slot 327 against the pin 56, by means of the spring 59. The shaft $c$ is provided with a spur gear 328 which meshes with a pinion 329 carried by a shaft 330. The shaft 330 carries also a gear segment 331 and a cam disk 332. The disk 332 carries a cam extension 333 arranged to coöperate with the bearing point 334 of the arm 335 rigid with one of the arms 33 of the universal key lock 34. The shaft 330 will be driven a complete revolution in a counter-clockwise direction by the gear 328 during the return movement of the operating lever arm of the machine and during the latter part of this movement the gear segment 331 will be brought into contact with rack teeth 336 on the rack bar 58. This will cause a downward movement of the rack bar 58 against the tension of the spring 59, the amount of movement being equal to the maximum upward movement of the bar 53. During this downward movement, the upper end of the slot 326 will engage with the pin 325 and pick it up at whatever position it may have been stationed by the original rotation of the shaft $b$. The pin 325 and the bar 53 will thus be carried with the rack 58 downwardly to its original position. Just before the two racks reach their extreme downward position, the extension surface 333 of the cam disk 332, will contact with the point 334 of the lever 335 and move the lever upwardly, and thus rotate the universal key lock 34 to release the depressed key, which will then be sprung back to its upper position by its spring 30. The upward movement of the depressed key 25 will permit the bar 62 to swing backwardly to its original position and bring the detent 61 to bear upon the disk 42 in position to drop into the notch therein when the rack bars 53 and 58 reach their extreme position, thus bringing the disk 42 and the shaft $b$ to their initial positions. In this way the shaft $b$ and the bar 53 will be locked in their original positions, and as soon as the segment 331 has moved out of contact with the rack teeth 336, the bar 58 will be free to be drawn upwardly to its normal position by the spring 59.

*Mechanism for ascertaining an amount of a given value.*

It sometimes happens that a customer wishes to purchase a small amount of an article having a given value rather than an amount of a particular weight. Provision is made in the present device to ascertain the amount of a given value at a given price in order to accommodate customers of this character. Since the amounts sold in this way are usually small, the embodiment of the invention illustrated in the drawings shows means for dealing with amounts in this way up to one pound only, but it is evident that the principle could be extended to include larger amounts if it were found desirable to do so. Mechanism for this purpose is best shown in Figs. 1, 7, 16 and 17. Mounted coaxially with the scale shaft 154, but rotatable independently thereof, is a shaft 340. This shaft is provided with a wheel or drum 341 having a flattened rim 342 provided with a scale 343. The scale 343 is divided into twenty four equal divisions of exactly the same length as the divisions on the scale drum 145, representing pounds. These divisions are subdivided into smaller divisions. Each of the primary divisions of the scale 343 represents a price per pound and is provided with a number of subdivisions corresponding to the number of units in the price which it represents. Thus the division representing eight cents per pound is divided into eight sub-divisions; the division representing nine cents per pound into nine subdivisions, etc. As shown in Fig. 17, the outer casing of the machine is provided with an opening 344 which is adjacent the opening 345 through which the scale reading is taken by the attendant. Mechanism which will be described, is provided for bringing the particular division of the scale 343 corresponding to the price at which the sale is being made, into position in front of the opening 344, the lower end of the scale division being brought into alinement with the zero position of the scale drum. In Fig. 17 the scale division corresponding to twelve cents per pound is shown opposite the opening. If a customer wishes to buy twelve cents' worth at twelve cents per pound, it is clear that a sufficient amount must be placed upon the scale pan to move the scale drum an amount representing one pound, which is exactly the length of the division of the scale 343 opposite the opening. That is an amount must be placed upon the scale pan sufficient to bring the zero marking of the scale drum 145 opposite the extreme marking of the division on the scale 343. If it is desirable to purchase ten cents' worth at twelve cents per pound, the scale drum must move an amount equal to ten twelfths of a pound, or to a position opposite the subdivision marked ten of the scale 343. In other words, all that the attendant need to do to ascertain an amount of a given value, is to place material on the scale pan until the zero reading of the scale drum 145 is opposite the number representing the desired value on the scale 343. Mechanism for bringing the proper division of the scale 343 opposite the opening 344, is illustrated in Figs. 1, 7 and 16. The shaft $b$ is provided at its end adjacent the frame member 20 with a beveled pinion 346 which meshes with a beveled pinion 347 secured to an upright shaft 348 carried in brackets 349 and 350 secured to the frame member 20. The upper end of the shaft 348 is provided with a beveled pinion 351 meshing with a pinion 352 secured to the shaft 340. It is apparent that through this train of gearing, the shaft 340 will be rotated from the shaft $b$ an amount proportional to the rotation of the shaft $b$ and controlled by the particular price key depressed. It is therefore only necessary to properly proportion the gearing in order to bring the division of the scale 343 which corresponds to the particular key depressed, opposite the opening 344 at any operation.

Since in the embodiment shown in the drawing the scale is designed to weigh articles up to twenty-four pounds only, it is evident that the rim 342 will have sufficient space for but twenty-four divisions of a length equal to the pound divisions on the scale 155. It is therefore necessary to provide an additional scale to represent the prices above eight plus twenty four cents per pound, when the scale starts with eight cents. This second scale is shown at 353 in Fig. 1 and is placed on the rim 342 contiguous with the scale 343. In order to bring the scale 353 into operative position at the proper time, it is necessary to provide means for shifting the wheel 341 along its axis after the wheel has made one complete revolution. To accomplish this, the wheel is provided with a trip pin 354 carried on a lug 355 projecting laterally from one spoke of the wheel. A contact member 356 is carried on a shaft 357 in position to coöperate with the trip pin 354. The shaft 357 is journaled in brackets 358 and 359 carried by the frame member 20, and is provided near its upper end with a pinion 360 which meshes with a circular rack 361 slidably mounted on the shaft 340. The contact member 356, as shown in Fig. 16, is bifurcated and has a long fork 362 and a short fork 363. When the wheel 341 begins its rotation, the parts of the trip mechanism are in the position shown in full lines in Fig. 16, and the rotation of the wheel is toward the left in Fig. 16. After the wheel has made a complete revolution, the trip pin 354 will again come opposite the contact member 356, but on the right of the bifurcation 362 instead of the left, as shown in the figure. Further rotation of the wheel 341 will cause the pin 354 to rotate the contact member 356 into the position shown in broken lines in Fig. 16. This rotation of the member 356 and shaft 357 will cause the pinion 360 to slide the rack 361 along the shaft 340, and since the rack is rigidly connected with the wheel 341, the wheel itself will be slid laterally along its supporting shaft. This will bring the wheel into position shown in broken lines in Fig. 16 and consequently will move the scale divisions 353 opposite the opening 344 in the instrument casing. Further rotation of the wheel 341 will bring the successive divisions of the scale 353 into position opposite the opening 344 in proper order.

When the shaft $b$ is again rotated during the restoration of the price key, the shaft 340 will be given a reverse rotation equal in amount to the direct rotation that it has been previously given. If the wheel 341 has been rotated an amount to bring the pin 354 past the contact member 356, on the return movement of the wheel the pin will strike the short arm 363 of the bifurcated member and return the wheel to its original position along the axis 340. When the wheel has reached its original position, the pin 354 will be moved a sufficient amount to pass the end of the short arm 363, leaving the contact member in proper position for the next operation.

The operation of the various parts has been described in connection with the structure of the machine and it is thought that it will be unnecessary to repeat in detail a description of the operation of the machine. The movements to be made by the salesman or attendant are few and simple. He is merely required to press a key corresponding to the price at which the article is to be sold, and to give the operating lever a reciprocatory movement. The article being sold may be placed upon the scale pan either before or after the price key is depressed. These three things are all that the attendant is required to do. As a result, the scale will weigh the article, exhibiting the weight both to the customer and to the attendant; will also exhibit the price at which the article is being sold, to the customer, the attendant, and others in the room, and will print a ticket giving the price and the total value of the article sold, thus providing a complete check upon the work of the salesman and eliminating entirely the personal element from the weighing and computing operation. In addition to the above, the scale provides a very simple means by which the customer may be given an amount of a particular value at a given price, and at the same time a ticket will be printed giving the price and the value in the same way as in the previously mentioned operation.

I claim:

1. In combination, a weight-actuated member, computing mechanism, means independent of said weight-actuated member for driving said computing mechanism, and a device actuated by said driving means and arranged for yielding engagement with said weight-actuated member to establish connection between said member and said computing mechanism.

2. The combination with computing mechanism, of a weight-actuated member for controlling said mechanism, a trip stop carried by said member, and a yielding contact device arranged to coöperate with said trip stop for controlling computing operation of said computing mechanism.

3. The combination with value computing mechanism, of a movable member for controlling said mechanism, means for moving said member an amount proportionate to the weight of an article, and a yielding device for contacting with said movable member for controlling computing operation of said computing mechanism.

4. In combination with the computing mechanism of a calculating machine, a weight actuated member for controlling said mechanism, and a contact device for establishing connection between said member and said mechanism, said device being arranged to yield to said member when brought into contact therewith.

5. In combination with the computing mechanism of a calculating machine, a contact device for controlling said mechanism, and a weight actuated member arranged to coöperate with said contact device and to cause said device to yield to said member when brought into contact therewith.

6. In combination, a movable member, means for moving said member an amount proportional to the weight of an article, computing mechanism, a control device for said computing mechanism having a contact member arranged to coöperate with said movable member and to yield to said movable member when brought into contact therewith, the amount of yielding movement of said contact member being independent of the position of said movable member.

7. The combination with computing mechanism, of a weight-actuated member for controlling said mechanism, means for securing said member against movement, movable means for establishing connection between said computing mechanism and said weight-actuated member, and a yielding device connected with said movable means for yieldingly engaging said weight-actuated member when said movable means has traveled an amount proportional to the movement of said weight-actuated member.

8. In combination with the computing mechanism of a calculating scale, a weight actuated member for controlling said mechanism, means for holding said member against movement, and a contact device arranged to coöperate with said member when so held for controlling operations of said computing mechanism, said weight actuated member and said contact member being arranged to coöperate with one another at the same bearing points for different weights.

9. The combination with computing mechanism, of a weight-actuated member for controlling said mechanism, means for holding said member against movement, and a control device for said computing mechanism arranged to coöperate with said weight-actuated member when so held and to yield thereto for the purpose of controlling said computing mechanism.

10. The combination with computing mechanism, of a weight-actuated member for controlling said mechanism, means for holding said member against movement, a control device for said computing mechanism, and a contact member carried by said control device and arranged to contact with said weight-actuated member while said weight-actuated member is held against movement, and arranged also to yield to said weight-actuated member for the purpose of controlling said computing mechanism.

11. The combination with computing mechanism, of a weight actuated member for controlling said mechanism, a control device for said mechanism arranged to move along the path of said weight actuated member to contact with said member at different positions thereof, and means for holding said contact device out of the path of said weight actuated member during movement of the latter.

12. The combination with computing mechanism, of a weight actuated member for controlling said mechanism, and means for contacting with said weight actuated member at different positions along its path of movement for controlling said computing mechanism, said means being movable into and out of the path of movement of said weight actuated member.

13. The combination with computing mechanism, of a movable stop member for controlling said mechanism, and a contact device connected with said mechanism and arranged to coöperate with said stop member for controlling said mechanism, said device being movable into and out of the path of movement of said stop member.

14. The combination with computing mechanism, of a movable trip stop for controlling said mechanism and a contact device for controlling said mechanism arranged to yieldingly contact with said trip stop.

15. The combination with computing mechanism, of a movable trip stop for controlling said mechanism, and a contact device movable into one position in which relative movement of said stop and device will cause them to engage one another to control said mechanism and into a second position out of the path of movement of said trip stop.

16. The combination with computing mechanism, of a movable trip stop for controlling said mechanism, means for holding said trip stop against movement, and a contact device arranged to yieldingly contact with said trip stop when so held to control said computing mechanism.

17. The combination with computing mechanism, of a movable trip stop for controlling computing operations of said mechanism, a movable device for establishing operative connection between said trip stop and said computing mechanism, a contact member carried by said device for coöperation with said trip stop, and means for moving said contact member out of the path of movement of said trip stop and for bringing said contact member into position to yieldingly contact with said trip stop to control a computing operation of said computing mechanism.

18. In combination, a weight-actuated trip stop, computing mechanism arranged to be controlled by said trip stop, a control device for said computing mechanism, a contact member carried by said control device, means for moving said member out of the path of movement of said trip stop during the movement of said trip stop, and means for moving said contact member into position to coöperate with said trip stop after the movement thereof and to yield thereto to control the operation of said computing mechanism.

19. In combination, a weight-actuated trip stop, means for fixedly securing said trip stop against movement, computing mechanism, a movable control device for said computing mechanism, a contact member carried by said control device, and means for moving said contact member out of the path of movement of said trip stop and for moving said contact member into position to yieldingly contact with said trip stop to control the action of said computing mechanism.

20. In combination, a weight-actuated contact member, bearings in which said member is movably supported, means for clamping said member against movement independently of said bearings, and computing mechanism having a control device movable into and out of the path of movement of said member.

21. In combination, a weight-actuated control device, bearings in which said device is movably mounted, a clamp for holding said device against movement independently of said bearings, a trip stop carried by said device, computing mechanism having a control member arranged to yieldingly contact with said trip stop and movable into and out of the path of movement of said stop.

22. In combination, a counter movable through the consecutive digits of a number comprising a plurality of decimal orders, means for driving said counter through consecutive digits from zero upwardly, a computing device and automatic means for limiting the movement of said counter to an amount representing the value of an article computed by said device without limiting the movement of said counter-driving means.

23. In combination, a counter, means for moving said counter to successively indicate the different digits of a number comprising a plurality of decimal orders, and computing mechanism for disconnecting said counter from said moving means therefor, to automatically limit the movement of said counter to an amount proportional to the computed value of an article, without limiting the amount of movement of said counter-moving means.

24. In combination, a counter having a plurality of number wheels, a shaft for operating said counter to cause said number wheels to indicate successively the different digits of a number comprising a plurality of decimal orders, means for rotating said shaft and computing mechanism for automatically stopping the rotation of said shaft while permitting the continued movement of the rotating means therefor when said shaft has moved an amount proportional to the computed value of an article.

25. In combination, a counter, means for driving said counter an amount proportional to the price of an article, and means for disconnecting said counter from said driving means when said counter has been driven an amount proportional to the weight of said article.

26. In combination, a counter, means for driving said counter at different rates of speed proportional to different prices per unit value, and means for disconnecting said counter from said driving means when said counter has been driven an amount proportional to the quantity of an article.

27. In combination, a counter, means for driving said counter an amount proportional to the price of an article, and weight-controlled mechanism for disconnecting said counter from said driving means.

28. In combination, a counter, a driving device for said counter, means for varying the speed ratio between said counter and said driving device to amounts proportional to different prices, and means for disconnecting said counter from said driving device when said counter has been moved thereby an amount proportional to the quantity of an article.

29. In combination, a counter, a shaft for operating said counter, a plurality of driving devices for said shaft the speed ratio between said driving devices and said shaft being proportional to different prices, and means for automatically disconnecting said driving devices from said shaft when said driving devices have been moved an amount proportional to the quantity of an article.

30. In combination, a counter, a shaft for driving said counter, a plurality of gears of different sizes proportional to different prices, means for selectively connecting said gears with said counter, and means for disconnecting said gears from said counter when said gears have been rotated an amount proportional to the quantity of an article.

31. In combination, a counter, an operating device, means for establishing different driving connections between said counter and said operating device such that said counter will be driven amounts proportional to different prices for a given movement of said operating device, and weight-controlled means for disconnecting said counter from said operating device.

32. In combination, a counter, an operating device, a variable gear train for connecting said counter with said operating device and for changing the speed ratio between said counter and said device, and weight-controlled means for disconnecting said counter from said operating device.

33. In combination, a counter, an operating device, a variable gear train for connecting said counter with said operating device and for establishing different gear ratios between said counter and said device such that the rotation of said counter for a given movement of said operating device may be made proportional to different prices of an article, and weight-controlled means for disconnecting said counter from said operating device.

34. In combination, a counter, a plurality of operating gears for said counter, said gears being proportional to various prices, means for selectively connecting said counter with said gears, and weight-controlled means for disconnecting said counter from said gears.

35. In combination, a counter, a shaft for operating said counter, a plurality of price gears of different sizes proportional to different prices, means for selectively connecting said shaft with said price gears to be driven thereby, and means for disconnecting said shaft from said price gears when said price gears have rotated an amount proportional to the weight of an article.

36. In combination, a counter, a plurality of price gears of different sizes, means for selectively connecting said counter with said price gears to be driven thereby comprising a clutch member and means for operating said clutch to break the connection between said price gears and said counter when said price gears have been rotated an amount proportional to the quantity of an article.

37. In a device for computing a quantity depending upon two different factors, a counter, means for operating said counter at a rate proportional to one of said factors, and means for disconnecting said counter from said operating means when said operating means has moved an amount proportional to the other of said factors.

38. In a device for computing a quantity depending upon two factors, a registering device, operating means for said registering device, means for establishing driving ratio between said operating means and said registering device proportional to one of said factors, and means for disconnecting said operating means from said registering device when said operating means has moved an amount proportional to the other of said factors.

39. In combination, a registering device, operating means for said registering device, mechanism for selectively establishing different speed ratios between said operating means and said registering device, and mechanism for disconnecting said registering device from said operating means during the movement of said operating means.

40. In a machine for computing values depending upon different factors, a register, an operating device for said register, means for establishing different speed ratios between said operating device and said register proportional to one of said factors, a clutch connecting said register and said operating device, and means for automatically disconnecting said clutch when said operating device has been moved an amount proportional to the other of said factors.

41. In combination, a register, operating means for said register, and weight-controlled means for disconnecting said register from said operating means.

42. In combination, a register, operating means for said register, and weight-controlled means for disconnecting said register from said operating means when said operating means has moved an amount proportional to the weight of an article.

43. In combination, a register, operating means for said register, a clutch for connecting said register with said operating means, and weight-controlled means for disconnecting said clutch when said operating means has moved an amount proportional to the weight of an article.

44. In combination, a register, operating means for said register, and weight-controlled means for disconnecting said register from said operating means and for positively stopping the movement of said register when said operating means has moved an amount proportional to the weight of an article.

45. In combination, a register, operating means for said register, means for establishing different speed ratios between said operating means and said register, and weight-controlled means for disconnecting said register from said operating means and for positively stopping the movement of said register when said operating means has moved an amount proportional to the weight of an article.

46. In combination, a register, an operating means for said register, a clutch for connecting said register with said operating means, a dog for preventing movement of said register, and weight-controlled means for disconnecting said clutch and placing said dog in holding position during the movement of said operating means.

47. In combination, a register, operating means for said register, a clutch for establishing driving connection between said operating means and said register, weight-controlled means for operating said clutch, a dog for holding said register against movement, and means for holding said dog out of operative position when said clutch is in driving position.

48. In combination, a register, operating means for said register, a clutch for connecting said register and said operating means, a dog and star wheel for preventing movement of said register, a flange on said star wheel for holding said dog out of contact therewith when said clutch is in operative position, but permitting said dog to contact with said star wheel to hold said register from movement when said clutch is out of operative position, and a weight-actuated device for controlling said clutch.

49. In combination, a registering device, means for operating said registering device, mechanism for disconnecting said registering device from said operating means during the movement of said operating means, means for driving said operating means, and a lost motion connection between said driving means and said operating means of an amount to compensate for the movement of said operating means during the process of disconnecting said registered device from said operating means.

50. In combination, a registering device, operating means for said registering device, mechanism for disconnecting said operating means from said registering device during the movement of said operating means, a driving device for said operating means, and a lost motion connection between said driving device and said operating mechanism, arranged to permit independent movement of said operating mechanism and said driving device of an amount equal to that required during the operation of said disconnecting mechanism.

51. In combination, a register, operating means for said register, a driving device for said operating means, weight-controlled mechanism for disconnecting said operating means from said register operable during the movement of said operating means, a lost motion connection between said driving device and said operating means and arranged to permit independent movement of said driving means and said operating means of an amount equal to the movement of said operating means during the disconnecting operation of the operating means from said register.

52. In combination, a register, price wheels for operating said register, a shaft for driving said price wheels, means for disconnecting said price wheels from said register during operation of said price wheels, and a lost motion connection beween said shaft and said price wheels to compensate for the movement of said price wheels during the process of disconnecting said price wheels from said register.

53. In combination, a register, price wheels for operating said register, a weight-controlled device for disconnecting said price wheels from said register during the operation of said price wheels, a rotary member for operating said price wheels, and a lost motion connection between said rotary member and said price wheels arranged to permit independent motion of said price wheels and said rotary member of an amount equal to the movement of said price wheels during the disconnection of said price wheels from said register.

54. In combination, a register, a series of different sized price gears, means for selectively connecting said register with said price gears, weight-controlled means for disconnecting said register from said price gears during the movement of said price gears, a shaft on which said price gears are mounted for rotation, an arm carried by said shaft and having a lost motion connection with said price gears arranged to permit a preliminary movement of said shaft independent of said price gears of an amount equal to the movement of said price gears during the operation of said disconnecting means.

55. In combination, a register, a plurality of different sized price gears, means for selectively connecting said price gears with said register, a weight-controlled trip stop, a shaft for operating said price gears, means carried by said shaft and rotatable therewith for contacting with said weight-controlled device for disconnecting said price gears from said register, and a lost motion connection between said shaft and said price gears.

56. In combination, a register, a price gear for operating said register, a weight-controlled trip stop, a shaft for operating said price gear, a contact member carried by said shaft arranged to coöperate with said trip stop to disconnect said gear from said register during the movement of said shaft, and a lost motion connection for driving said gear from said shaft and arranged to permit movement of said shaft independent of said gear of an amount equal to the movement of said shaft during the operation of said disconnecting mechanism.

57. In combination, a register, driving mechanism for operating said register, a shaft for moving said driving mechanism, a weight-controlled trip stop, an arm carried by said shaft, a contact member carried on said arm arranged to be moved by said trip stop during the movement of said shaft, a clutch connecting said register and said driving mechanism, and a train of gearing connecting said contact member with said clutch for disconnecting said clutch when said contact member strikes said trip stop.

58. In combination, a register, a price gear for operating said register, a clutch for connecting said price gear with said register, a shaft for operating said price gear, an arm carried by said shaft, a train of gearing connected with said arm and arranged to operate said clutch, and a weight-actuated trip stop arranged to operate said gear train to disconnect said clutch when said shaft has rotated an amount equal to the movement of said trip stop.

59. In a computing mechanism, a counter, means for moving said counter, a resetting device driven by said counter during said movement, and means for returning said device an amount equal to that by which it was driven by said counter for returning said counter to its original position.

60. In combination, a counter, mechanism for driving said counter for performing a computing operation, a resetting device driven by said counter during said computing operation, and means for returning said device to its original position for restoring said counter to its original position.

61. In combination, a counter, means for driving said counter to perform a computing operation, means for disconnecting said driving means from said counter during the movement of said driving means, and means independent of said driving means for restoring said counter to its initial position.

62. In combination, a counter, means for driving said counter to perform a computing operation, a device driven by said counter during said computing operation, and means for driving said device an amount equal to the amount it is driven by said counter but in a reverse direction for restoring said counter to its initial position.

63. In combination, a counter, means for driving said counter to perform a computing operation, means for disconnecting said driving means from said counter during the movement of said driving means, and a device independent of said driving means, arranged to be driven by said counter during said computing operation, and mechanism for returning said device an amount equal to the movement imparted thereto by said counter for restoring said counter to its initial position.

64. In combination, a counter, means for driving said counter for performing a computing operation, means for disconnecting said driving means from said counter during the movement of said driving means, mechanism for restoring said driving means to its original position after it has been disconnected from said counter, and mechanism independent of said driving means for restoring said counter to its original position.

65. In combination, a counter, a shaft for operating said counter, a price gear for driving said shaft, means for operating said price gear, a weight - controlled device for disconnecting said price gear from said counter during the movement of said price gear, and means for independently restoring said price gear and said counter to their initial positions.

66. In combination, a counter, means for driving said counter to perform a computing operation, a device driven by said counter an amount proportional to the movement thereof, and means for returning said device to its original position for restoring said counter to its original position.

67. In combination, a counter, a rotary member for driving said counter, to perform a computing operation, means for driving said rotary member a fixed amount, means for disconnecting said counter from said rotary member during said driving operation, a device driven by said counter an amount proportional to the movement thereof prior to its disconnection from said driving means, and a contact member carried by said driving means for contacting with said device to restore said device and counter to their initial positions.

68. In combination, a counter, a price gear for driving said counter to perform a computing operation, means for disconnecting said counter from said price gear, a drive shaft for said price gear arranged to drive said price gear a complete rotation in one direction and return said price gear in the opposite direction to its original position, a gear wheel mounted on said shaft and arranged to be driven by said counter in the direction of the forward rotation of said price gear, and means carried by said price gear for returning said last mentioned gear wheel to its original position during the return movement of said price gear to restore said counter to its initial position.

69. In combination, a counter, a gear wheel connected with said counter to be driven thereby, an arm concentric with said gear wheel, means for imparting a complete rotation to said arm in the direction of the forward movement of said gear wheel, and for returning said arm to its initial position, and a contact device carried by said arm for engaging said gear wheel to return said gear wheel to its initial position during the return movement of said arm.

70. In combination, a counter, a gear wheel driven by said counter an amount proportional to the movement thereof, a stop carried by said gear wheel, an arm movable about the axis of said gear wheel, and a contact member carried by said arm for coöperating with said stop to restore said gear wheel and counter to their initial positions, said contact member being yieldingly held in position against movement in one direction and rigidly in position against movement in the other direction.

71. In combination, a counter, means for restoring said counter to its initial position after an operation thereof, comprising a rotary member having a stop thereon, an arm for moving said rotary member, and means for imparting a fixed amount of movement to said arm in one direction in advance of said stop and for returning said arm an equal amount in the opposite direction to pick up said stop regardless of the amount of movement that has been made by it and return said stop and rotary member to their initial positions.

72. In combination, a rotary shaft, means for operating said shaft, a plurality of keys for controlling the operation of said shaft, a computing device, and means arranged to be set at various positions by the rotation of said shaft for controlling the operation of said computing device.

73. In combination, a rotary shaft, a plurality of price keys for controlling the amount of movement of said shaft, a computing device, and means controlled by said shaft for regulating the amount of movement of said computing device.

74. In combination, a rotary shaft, resilient means for operating said shaft, a device for normally holding said shaft against operation, a plurality of price keys for releasing said holding device and for controlling the amount of rotation of said shaft, a register, and means controlled by the amount of rotation of said shaft for regulating the movement of said register.

75. In combination, a rotatable shaft, a plurality of stop members carried by said shaft at different angular positions thereon, price keys arranged to coöperate with said stop members to control the amount of rotation of said shaft, a register, and means controlled by said shaft for restricting the movement of said register to an amount proportional to the price represented by a particular price key which is depressed.

76. In combination, a rotary shaft, price keys for controlling the amount of movement of said shaft, a register, means for operating said register, a shiftable gear train for connecting said register with said operating means, and means operated by said shaft for moving said gear train.

77. In combination, a register, a plurality of different sized price gears for driving said register, a shiftable gear train for selectively connecting said price gears with said register, a rotatable shaft, means operated by said shaft for moving said shiftable gear train, and a plurality of price keys for controlling the movement of said shaft.

78. In combination, a register, a plurality of price gears for driving said register, a plurality of price keys corresponding to said price gears, a rotary shaft controlled by said price keys, and a shiftable gear train controlled by said shaft for connnecting said register with a price gear corresponding to a price key depressed.

79. In combination, a rotatable shaft, a spring-actuated rack for rotating said shaft, price keys for releasing said shaft for rotation and for controlling the amount of rotation thereof, a computing device and means controlled by said shaft for regulating the movement of said computing device to an amount proportional to the price represented by a particular price key depressed.

80. In combination, a register, an adjustable means for controlling the amount of movement of said register, a rotary shaft connected with said adjustable means, a spring-actuated rack for rotating said shaft, a detent for holding said shaft against rotation, a plurality of price keys for releasing said detent to permit rotation of said shaft and for controlling the amount of rotation thus permitted, and a second rack for returning said shaft and price keys to their original positions.

81. In combination, a computing device and keyboard mechanism for controlling said computing device, said mechanism comprising a rotatable shaft, a spring-actuated rack for rotating said shaft, a plurality of price keys for controlling the amount of rotation of said shaft, a universal lock for holding said keys in depressed position, means for returning said shaft to its original position after a computing operation, and means for releasing said lock to permit said keys to return to their original position.

82. In combination, a computing device, shiftable means for controlling said computing device, and mechanism for controlling said shiftable means, comprising a rotatable shaft, a spring-actuated rack for moving said shaft, a detent for holding said shaft from rotation, a plurality of keys for releasing said detent and for controlling the amount of rotation of said shaft, a universal lock bar for holding said keys in depressed position, a second rack for returning said shaft to its original position against the tension of said spring-actuated rack, and means for releasing said keys to permit said keys to return to their original position.

83. In combination, a rotatable shaft, a spring-actuated rack for operating said shaft, a detent for holding said shaft against rotation, a plurality of price keys for releasing said detent and for limiting the rotation of said shaft, a universal lock bar for holding said keys in depressed position when moved to release said detent, a second rack for restoring said shaft to its original position, and means for releasing said keys and detent to permit said detent to hold said shaft in its restored position and to permit said keys to return to their original position.

84. In combination, a device for indicating the amount of an article of a given value to enable an operator to portion out the proper amount of said article to have said given value, and means other than said indicating device for computing the values of different amounts of said article.

85. In combination, a device for indicating the amount of an article of a given value, and means other than said indicating device for computing and recording the value of different amounts of said article.

86. In combination, a weight-actuated scale, and a price scale arranged for use in conjunction with said weight actuated scale and adjustable relative thereto to indicate weights having various given values at different prices.

87. In combination, a weight-actuated scale and a price scale operable in conjunction therewith and adjustable relative thereto to indicate weights having various given values at different prices, and mechanism controlled by said scale for computing the value of an article of a weight indicated by the movement of said scale.

88. In combination, a weight-actuated scale, means for indicating the value of an article of a weight indicated by the amount of movement of said scale, and mechanism for computing said value.

89. In combination, a weight-actuated scale, a device for indicating when said scale has moved an amount corresponding to a weight of a given value, and means for computing the value of an article corresponding in weight to the amount of movement of said scale.

90. In combination, a weight-actuated scale, an adjustable device for indicating the amount of movement of said scale corresponding to a weight of a given value at different prices, and means for computing the value of an article corresponding in weight to the amount of movement of said scale.

91. In combination, a weight-actuated scale, an adjustable device for indicating the amount of movement of said scale corresponding to a weight of a given value at different prices per unit weight, and means for computing the value of an article corresponding in weight to the amount of movement of said scale at a price per unit weight corresponding to that to which said indicating device is adjusted.

92. In combination, a device for computing the value of an article, and means for indicating the value of said article prior to said computing operation.

93. In combination, a device for computing the value of an article of a given weight, and means for indicating the value of said article prior to said computing operation.

94. In combination, a device controlled by the weight of an article for indicating the value thereof at a predetermined price per unit weight, and means for indicating the value of said article at said price per unit weight prior to said computing operation.

95. In combination, a device controlled by the weight of an article for computing and recording the value thereof, and means for indicating the value of said article prior to said computing and recording operation.

96. In combination, a weight-controlled device for computing the value of an article at a predetermined price per unit weight, and means for indicating the amount of said article corresponding to a given value prior to said computing operation.

97. In combination, a weight-controlled device for computing and recording the value of an article at a predetermined price, and means for indicating the amount of said article corresponding to a given value prior to said computing and recording operation.

98. In combination, a weight-controlled device for computing the value of an article, a device for indicating independently of the computing operation of said weight control device the amount of said article corresponding to the given value, and means for setting said computing device and said indicating device to operate at the same price per unit weight.

99. In combination, a device for computing values at different prices per unit quantity, a second device operable independently of said first device for indicating values at different prices per unit quantity, and means for setting said indicating and computing devices to operate at various prices per unit quantity.

100. In combination, a device for computing values at different prices per unit quantity, means operable independently of said first-mentioned device for indicating values at different prices per unit quantity, and a common means for setting said computing device and said indicating device to operate at various prices per unit quantity.

101. In combination, a device for computing values at different prices per unit quantity, a device operable independently of said first-mentioned device for indicating values at different prices per unit quantity, and a common means for setting said computing device and said indicating device for operation at the same price per unit quantity.

102. In combination, a weight-controlled scale, a device for computing the value of an article corresponding to the amount of movement of said scale, a device operable independently of said first-mentioned device for indicating the value of an article corresponding to the movement of said scale, and a common means for setting said computing device and said indicating device for operation at the same price per unit weight.

103. In combination, a weight-controlled scale, means for computing and recording the value of an article at various prices corresponding to different amounts of movement of said scale, means for indicating the amount of movement of said scale which corresponds to given values at different prices, and means for setting said computing device and said indicating device for operation at different prices per unit weight.

104. In combination, a weight-controlled scale, a device for computing and recording the value of articles corresponding to different movements of said scale at various prices per unit weight, a device for indicating the amount of movement of said scale which corresponds to given values at various prices per unit weight, and a common means for setting said computing device and said indicating device for operation at the same price per unit weight.

105. In combination, a weight-controlled scale having scale divisions thereon corresponding to pounds and fractions thereof, and a second scale in juxtaposition with said first scale and adjustable relative thereto, and having divisions thereon of the same length as the pound divisions on the first scale but divided into sub-divisions representing the units of different prices per pound.

106. In combination, a scale for indicating the weight of an article, a second scale positioned adjacent said first scale and provided with divisions for indicating the amount of movement of said first scale corresponding to different weights of an article of given values and means for adjusting said second scale for indicating amounts of given values at various prices.

107. In combination, a weight-controlled scale, a second scale positioned adjacent said first scale and movable into various positions relative thereto, and having divisions thereon for indicating amounts of movement of said first scale corresponding to given values, and a keyboard for adjusting said second scale to set said scale for indicating amounts of given values at different prices.

108. In combination, a weight-controlled scale, a second scale positioned adjacent said first scale and mounted for rotation upon an axis, divisions on said second scale for indicating amounts of movement of said first scale corresponding to given values, and means for rotating said second scale to adjust said scale for indicating amounts of given values at different prices.

109. In combination, a weight-controlled scale, a second scale mounted adjacent said first scale and provided with divisions for indicating amounts of movement of said first scale corresponding to given values, means for rotating said second scale about an axis for adjusting said scale to indicate amounts of given values at different prices, and means for moving said scale along said axis to assist in such adjustment.

110. In combination, a rotary scale member having two sets of scale divisions extending around the periphery thereof, means for rotating said scale member to bring the various divisions of one set into operative position, and means for shifting said scale member laterally to bring the other set of scale divisions into operative position.

111. In combination, a rotary scale member having a plurality of sets of scale divisions extending around the circumference thereof, means for rotating said scale member to bring the various scale divisions of one of said sets successively into operative position, and means for shifting said scale member laterally to bring the divisions of another of said sets into operative position during further rotation of said scale member subsequent to the movement of the divisions of said first set past the operative position.

112. In a computing scale, a rotary price shaft, price keys for controlling the amount of rotation of said shaft, mechanism controlled by said shaft for computing values at different prices, and mechanism controlled by said shaft for indicating said values at the same prices.

113. In combination, a device for computing values at different prices, a device for indicating values at different prices, and a common keyboard comprising a plurality of price keys for setting said devices to operate at the same price.

114. In combination, a rotary price shaft, a plurality of stop members carried by said shaft in different angular positions relative thereto, a plurality of price keys for coöperation with said stop members to limit the amount of movement of said price shaft, mechanism controlled by said price shaft for computing values at different prices, and mechanism controlled by said shaft for indicating values at different prices, said shaft being arranged to set said computing and indicating mechanisms for operation at the same price during any single operation of said shaft.

115. In combination, a device for computing values, an independently operable device other than said computing device for indicating values to enable an operator to portion out quantities of articles having previously selected values, and a common shaft for controlling said devices.

116. In combination, a device for computing values, a device other than said computing device for indicating values to enable an operator to portion out quantities of articles having previously selected values, a common price shaft for controlling said devices, and separate gear trains connecting said devices with said price shaft.

117. In combination, a weight-actuated scale, a device controlled by said scale for computing the value of an article corresponding to the movement thereof, a device coöperating with said scale for indicating the amount of movement thereof corresponding to given values, a common price shaft for controlling said computing device and said indicating device, and separate gear trains connecting said computing device and said indication device with said price shaft.

118. In combination, a computing device, a shaft for controlling said computing device, price keys for limiting the movement of said shaft, and a price indicator wheel geared to said shaft to be rotated thereby.

119. In combination, a device for computing values at various prices, a rotary shaft for controlling said computing device, price keys for limiting the movement of said rotary shaft, and a price indicator wheel driven by said shaft to indicate the price represented by a particular price key which is operated.

120. In combination, a device for computing values, a rotary shaft for controlling said computing device, a plurality of price keys independently operable to limit the rotation of said shaft to an amount proportional to different prices, and an indicator wheel connected with said shaft and rotatable an amount proportional to the rotation thereof for indicating which of said price keys is operated during an operation of said computing device.

121. In combination, a device for computing values, a rotary shaft for controlling said device, price keys for controlling said rotary shaft to set said device for operation at different prices per unit quantity, a movable member controlled by said shaft for indicating the price so selected, and means for recording the value computed and the price at which said computation is made.

122. In a computing scale, a weight-actuated disk, a clamp for fixedly securing said disk against movement, a spring-actuated member for operating said clamp, and a cam for controlling said spring-actuated member.

123. In a computing scale, a movable member, means for moving said member an amount proportional to the weight of an article, a clamp for fixedly securing said member in its adjusted position, a spring-actuated member for operating said clamp, and a cam for controlling said spring-actuated member.

124. In a computing scale, a disk, means for rotating said disk an amount proportional to the weight of an article, a pair of clamping jaws, resilient means for moving said jaws into contact with said disk to hold said disk in adjusted positions, and a device for preventing operation of said resilient means during the movement of said disk.

125. In a computing scale, a rotary disk, means for rotating said disk an amount proportional to the weight of an article, a trip stop carried by said disk, means for clamping said disk in adjusted positions, a contact member arranged to coöperate with said trip stop to control said computing scale and movable into and out of operative position, and means for moving said contact member into operative position subsequent to the operation of said clamping means.

126. In a computing scale, a weight-actuated member, a trip stop carried by said member, a clamp for holding said member in adjusted position, means normally tending to operate said clamp, a contact member arranged to coöperate with said trip stop to control said computing scale and movable into and out of operative position, means normally tending to move said contact member into operative position, and a control device for preventing operation of said clamp and for holding said contact member out of operative position, said control device being arranged to release said clamp and said contact member successively.

127. In a computing scale, a rotary member, means for rotating said member an amount proportional to the weight of an article, a trip stop carried by said member, a clamp for securing said member against movement, resilient means normally tending to operate said clamp, a contact member arranged to coöperate with said trip stop to control said computing scale and movable into and out of operative position, means normally tending to move said contact member into operative position, a cam shaft, a cam on said shaft for preventing operation of said clamp, a second cam on said shaft for holding said contact member out of operative position, and means for rotating said shaft to cause said cams to successively release said clamp and said contact member.

128. In combination, a register, means for operating said register, means for disconnecting said register from said operating means when it has moved an amount proportional to the value of an article, and means for truing said register after said disconnection to cause said register to indicate the whole number value nearest to the computed value.

129. In combination, a register, means for operating said register an amount proportional to the price per unit quantity of an article, means for disconnecting said register from said operating means when said operating means has moved an amount proportional to the quantity of an article, and means for truing said register to cause it to indicate the whole number value nearest the value indicated by said register when it is disconnected from said operating means.

130. In combination, a counter, price wheels for driving said counter, weight-controlled means for disconnecting said counter from said price wheels, and means for truing said counter to cause it to indicate the whole number value nearest the position it occupied when disconnected from said price wheels.

131. In combination, a counter, price wheels for operating said counter, weight-controlled means for disconnecting said price wheels from said counter when said price wheels have moved an amount proportional to the weight of an article, and means for stopping the movement of said counter after it has been disconnected from said price wheels and for truing said counter to cause it to indicate the whole number value nearest the value at which it was positioned when disconnected from said price wheels.

In testimony whereof I have signed my name to this specification on this 20th day of March, A. D. 1916.

OTTO MALCHER.